US011519667B2

(12) United States Patent
Chae et al.

(10) Patent No.: US 11,519,667 B2
(45) Date of Patent: Dec. 6, 2022

(54) SENSOR FOR COMMUNICATING WITH REFRIGERATOR AND CONTROL SYSTEM FOR REFRIGERATOR INCLUDING THE SENSOR

(71) Applicant: LG ELECTRONICS INC., Seoul (KR)

(72) Inventors: Jisuk Chae, Seoul (KR); Youngji Kim, Seoul (KR); Haesoo Lee, Seoul (KR); Eungyeong Gwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 103 days.

(21) Appl. No.: 16/983,222

(22) Filed: Aug. 3, 2020

(65) Prior Publication Data

US 2020/0363126 A1 Nov. 19, 2020

Related U.S. Application Data

(63) Continuation of application No. 15/408,705, filed on Jan. 18, 2017, now Pat. No. 10,775,101.

(30) Foreign Application Priority Data

Jan. 29, 2016 (KR) ........................ 10-2016-0011848

(51) Int. Cl.
*F25D 29/00* (2006.01)
*G01K 1/024* (2021.01)
(Continued)

(52) U.S. Cl.
CPC ............ *F25D 29/005* (2013.01); *F25D 11/00* (2013.01); *G01K 1/022* (2013.01); *G01K 1/024* (2013.01);
(Continued)

(58) Field of Classification Search
CPC .... F25D 11/00; F25D 29/005; F25D 2400/36; F25D 2500/06; F25D 2700/08; F25D 2700/16; G05B 19/048
See application file for complete search history.

(56) References Cited

U.S. PATENT DOCUMENTS 5,575,563 A   11/1996  Chiu et al.
5,798,694 A    8/1998  Reber et al.
(Continued)

FOREIGN PATENT DOCUMENTS

CN   101086412    12/2007
CN   103017436     4/2013
(Continued)

OTHER PUBLICATIONS

European Search Report dated May 30, 2017 issued in Application No. 17152443.2.
(Continued)

*Primary Examiner* — Henry T Crenshaw
(74) *Attorney, Agent, or Firm* — KED & Associates LLP

(57) ABSTRACT

Provided is a sensor package in a refrigerator configured to provide information related to refrigerated food. The sensor package may include a body having a mark classified by a type of food allocated to the sensor package and indicating the type of food of a food to which the sensor package is coupled, a battery, an operation switch, a memory configured to store food information corresponding to the type of food corresponding to the mark, a sensor communication module that communicates with a display provided in the refrigerator, a sensing module that senses state information associated with the food, and a sensor control module that controls the sensor communication module to initiate com-
(Continued)

munication between the sensor package and the display of the refrigerator based on the state information sensed by the sensing module.

4 Claims, 36 Drawing Sheets

(51) Int. Cl.
*G01K 1/022* (2021.01)
*F25D 11/00* (2006.01)
*G05B 19/048* (2006.01)

(52) U.S. Cl.
CPC ........ *G05B 19/048* (2013.01); *F25D 2400/36* (2013.01); *F25D 2500/06* (2013.01); *F25D 2700/06* (2013.01); *F25D 2700/08* (2013.01); *F25D 2700/16* (2013.01); *G01K 2207/04* (2013.01); *G05B 2219/2654* (2013.01)

(56) References Cited

U.S. PATENT DOCUMENTS

| | | | |
|---|---|---|---|
| 2001/0045096 A1 | 11/2001 | Tatter | |
| 2002/0150144 A1 | 10/2002 | Chapman | |
| 2002/0154574 A1 | 10/2002 | Ector, Jr. | |
| 2003/0067385 A1* | 4/2003 | Shank | A63H 33/00 340/541 |
| 2003/0132841 A1* | 7/2003 | Alderman | F25D 29/008 340/521 |
| 2006/0061454 A1 | 3/2006 | Debord et al. | |
| 2006/0264221 A1 | 11/2006 | Koike | |
| 2008/0202133 A1 | 8/2008 | Boer | |
| 2010/0100351 A1 | 4/2010 | Kobayashi et al. | |
| 2010/0205990 A1 | 8/2010 | French | |
| 2012/0137706 A1 | 6/2012 | Hussain | |
| 2012/0206242 A1 | 8/2012 | Cho | |
| 2013/0067937 A1* | 3/2013 | Lee | F25D 29/00 62/126 |
| 2013/0186123 A1 | 7/2013 | Garg | |
| 2014/0232519 A1 | 8/2014 | Allen | |
| 2014/0320647 A1 | 10/2014 | Seo et al. | |
| 2016/0350715 A1 | 12/2016 | Minvielle | |
| 2019/0195696 A1 | 6/2019 | Allen | |

FOREIGN PATENT DOCUMENTS

| | | |
|---|---|---|
| EP | 0 565 925 A1 | 4/1992 |
| EP | 2 322 999 | 10/2011 |
| JP | 2003-114075 | 4/2003 |
| JP | 2004-323118 | 11/2004 |
| JP | 2005-037086 | 2/2005 |
| JP | 2005-096963 | 4/2005 |
| JP | 2009-126630 | 6/2009 |
| KR | 1997-0002279 | 3/1997 |
| KR | 10-2010-0085242 | 7/2010 |
| KR | 10-2010-0085243 | 7/2010 |
| KR | 10-2012-0116207 | 10/2012 |
| WO | WO 2011/072296 | 6/2011 |

OTHER PUBLICATIONS

Korean Office Action dated Jun. 26, 2017 issued in Application No. 10-2016-0011848.
Japanese Office Action dated Dec. 19, 2017 issued in Application No. 2017-009062.
European Communication pursuant to Article 94(3) dated Apr. 3, 2018 issued in Application No. 17152443.2.
Japanese Office Action dated Jul. 31, 2018 issued in Application No. 2017-009062.
Chinese Office Action dated Jan. 3, 2019 issued in Application No. 2017100661484.4 (with English translation).
U.S. Office Action dated Feb. 25, 2019 issued in parent U.S. Appl. No. 15/408,705.
Chinese Office Action dated Jul. 2, 2019 issued in Application No. 201710061484.4.
U.S. Office Action dated Jul. 8, 2019 issued in parent U.S. Appl. No. 15/408,705.

\* cited by examiner

| « VEGETABLE/FRUIT | |
|---|---|
| FOOD INFORMATION | |
| FOOD NAME VEGETABLE/FRUIT 1 | |
| ⊙ IT'S SAFE | |
| RECOMMENDED USE-BY DATE | 13 DAYS LEFT |
| STORAGE PERIOD | STORED ONE DAY ▼ |
| CURRENT TEMPERATURE | 6 ℃ |
| CURRENT HUMIDITY | 90 % |
| SENSOR INFORMATION | |
| SENSOR KIND | TEMPERATURE-HUMIDITY SENSOR |
| BATTERY | 🔋 |
| RECOMMENDED USE-BY DATE | WITHIN 14 DAYS |
| RECOMMENDED STORAGE TEMPERATURE | 5 ~ 7 ℃ |
| RECOMMENDED STORAGE HUMIDITY | 85 ~ 95 % |
| IONIZER INFORMATION | |
| POWER SOURCE | ON |
| BATTERY | 🔋 |
| NOTIFICATION SETTING | |
| PUSH NOTIFICATION | (ON) |
| ☑ RECOMMENDED USE-BY DATE NOTIFICATION | |
| ☑ THAWING TEMPERATURE ARRIVAL NOTIFICATION | |
| STORE | |

660: IONIZER INFORMATION / POWER SOURCE / BATTERY

FIG. 6D

| ≪ PRECOOKED FOOD | |
|---|---|
| FOOD INFORMATION | |
| FOOD NAME | PRECOOKED FOOD |
| ○ IT'S SAFE | |
| RECOMMENDED USE-BY DATE | 4 DAYS LEFT |
| STORAGE PERIOD | STORED ONE DAY ▽ |
| CURRENT GAS AMOUNT | 0.1 Nm³/h |
| SENSOR INFORMATION | |
| SENSOR KIND | GAS SENSOR |
| BATTERY | ▰▰▱ |
| RECOMMENDED USE-BY DATE | WITHIN FIVE DAYS |
| RECOMMENDED STORAGE TEMPERATURE | 3 ~ 5 ℃ |
| SAFE GAS AMOUNT RANGE | within 0.1 Nm³/h |
| FRESHNESS MAINTAINING AGENT INFORMATION | |
| KIND | OXYGEN REMOVING AGENT |
| NOTIFICATION SETTING | |
| PUSH NOTIFICATION | ON |
| ☑ RECOMMENDED USE-BY DATE NOTIFICATION | |
| ☑ THAWING TEMPERATURE ARRIVAL NOTIFICATION | |
| ☑ SPOILAGE NOTIFICATION | |
| STORE | |

670 { FRESHNESS MAINTAINING AGENT INFORMATION / KIND

644 — ☑ SPOILAGE NOTIFICATION

FIG. 6E

```
≪ MILK
FOOD INFORMATION
           FOOD NAME
           MILK
        ○ IT'S SAFE
RECOMMENDED USE-BY DATE   6 DAYS LEFT
STORAGE PERIOD       STORED ONE DAY ▼
CURRENT REMAINING AMOUNT      900g(ml)   ← 625
SENSOR INFORMATION
SENSOR KIND            WEIGHT SENSOR
BATTERY
RECOMMENDED USE-BY DATE   WITHIN SEVEN DAYS
RECOMMENDED STORAGE TEMPERATURE   3~5 ℃
NOTIFICATION SETTING
PUSH NOTIFICATION                  (ON)
☑ RECOMMENDED USE-BY DATE NOTIFICATION
☑ THAWING TEMPERATURE ARRIVAL NOTIFICATION
☑ INSUFFICIENT REMAINING AMOUNT NOTIFICATION   ← 645
                       WHEN 20% REMAINS
              ( STORE )
```

FIG. 7G

| ≪ SETTING | |
|---|---|
| PRODUCT MANAGEMENT | |
| NICKNAME | Fresh Tag |
| GATEWAY NETWORK | iptime |
| SENSOR NETWORK | Fresh Gateway |
| SOFTWARE VERSION INFORMATION | |
| V1.0.0 | LATEST SOFTWARE |
| NOTIFICATION SETTING | |
| PUSH NOTIFICATION | ON |

781 { (PRODUCT MANAGEMENT section)
782 { (NOTIFICATION SETTING section)

SENSOR FOR COMMUNICATING WITH REFRIGERATOR AND CONTROL SYSTEM FOR REFRIGERATOR INCLUDING THE SENSOR

CROSS-REFERENCE TO RELATED APPLICATIONS

This application is a Continuation Application of U.S. patent application Ser. No. 15/408,705 filed Jan. 18, 2017, which claims priority under 35 U.S.C. § 119 to Korean Application No. 10-2016-0011848 filed on Jan. 29, 2016, whose entire disclosures are hereby incorporated by reference.

BACKGROUND

1. Field

The present disclosure relates to a sensor package and a refrigerator including the sensor package, and particularly, to a sensor package that senses various types of information related to food within a refrigerator, and transmitting or receiving such information to and from the refrigerator, and a refrigerator including the sensor package.

2. Background

Sensor packages and refrigerators having the same are known. However, they suffer from various disadvantages.

BRIEF DESCRIPTION OF THE DRAWINGS

The embodiments will be described in detail with reference to the following drawings in which like reference numerals refer to like elements wherein:

FIGS. 6A to 6F are conceptual views illustrating an example related to a sub-screen including state information of food, displayed on a display unit of a mobile terminal included in a refrigerator control system according to the present disclosure;

FIGS. 7A to 7G are conceptual views illustrating an example of a configuration screen related to a main screen, displayed on a display unit of a mobile terminal included in a refrigerator control system according to the present disclosure;

DETAILED DESCRIPTION

Figure 1A:
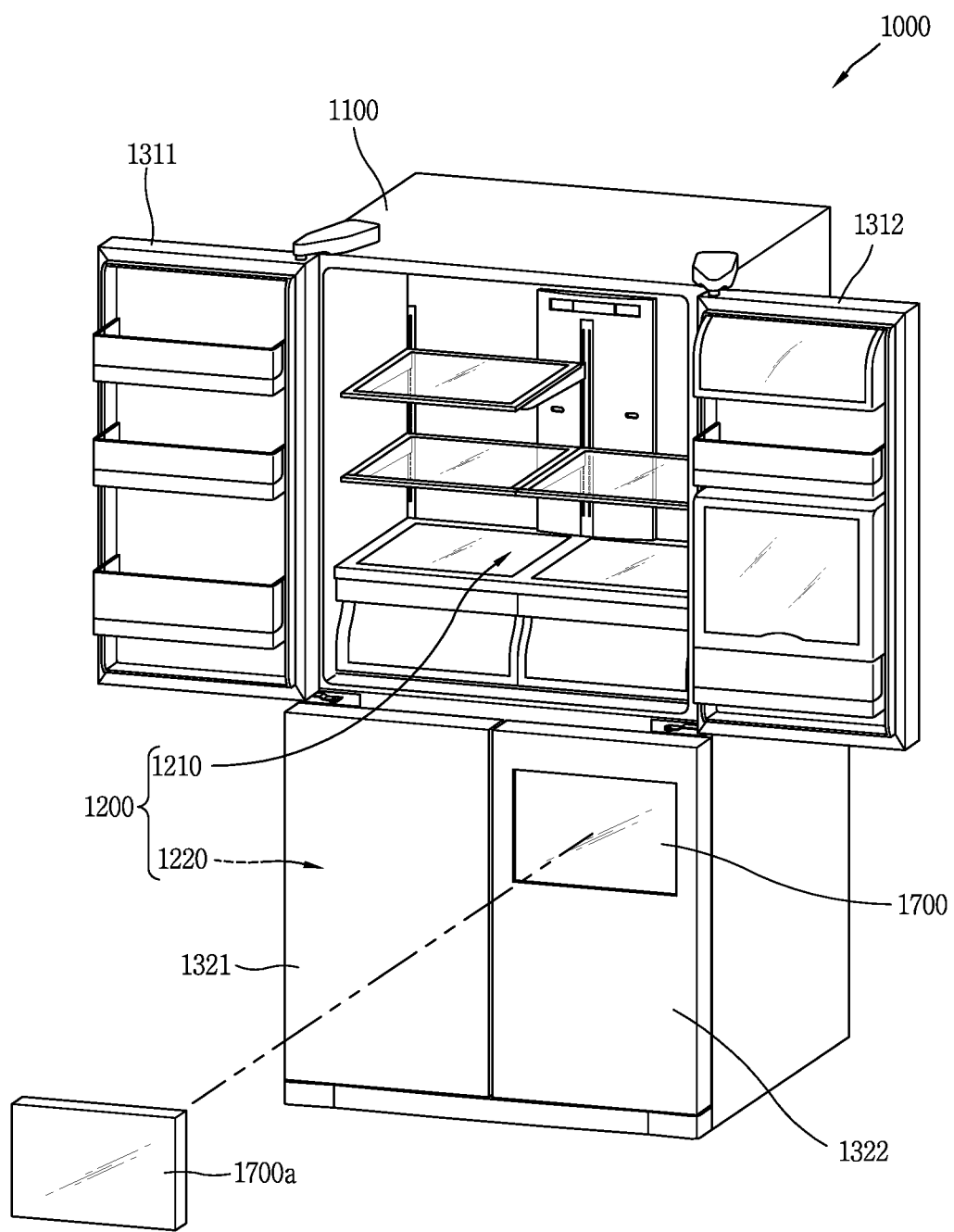
FIG. 1A is a conceptual view illustrating an example of a refrigerator related to the present disclosure.

Description will now be given in detail of the exemplary embodiments, with reference to the accompanying drawings. For the sake of brief description with reference to the drawings, the same or equivalent components will be provided with the same reference numbers, and description thereof will not be repeated.

A refrigerator is a device for freezing (freezing storage) and refrigerating (cold storage) an article therein. The refrigerator may include a refrigerator body having a food storage chamber and a refrigerating cycle device for cooling. The refrigerating cycle device includes a compressor, a condenser, an expander, and an evaporator. In general, a mechanical chamber may be formed in a rear area of the refrigerator body, and the compressor and the condenser of the refrigerating cycle device may be installed in the mechanical chamber.

In the refrigerator, an output unit that displays information related to an operation of the refrigerator may be provided. For example, the output unit may be installed in a door of the refrigerator and display various types of information related to the refrigerator. For example, information output on the output unit may include information related to food stored in the refrigerator.

Also, the refrigerator may include a communication unit that transmits or receives information related to an operation of the refrigerator. Thus, the communication unit of the refrigerator may perform communication with a server or a terminal present outside of the refrigerator, and may receive information to be displayed on the output unit from the server or the terminal.

An appropriate storage time limit of food kept in a refrigerating chamber or a freezing chamber varies according to a type of food and a storage start time, and a general refrigerator cannot check an appropriate storage time limit of each food stored therein or cannot transfer corresponding information to a user.

In particular, in larger refrigerators, a greater number of foods may be stored in refrigerators, and refrigerator users may not recall a purchase date of food stored in the refrigerator and a date in which a food was opened. Hence, this may result in the user discarding food which was recently purchased or keeping food which may have expired or spoiled.

In order to check an expiration date or an available time until expiration of food stored in the refrigerator, a user must directly check a state of food stored in the refrigerator at a predetermined time interval, causing considerable inconvenience to the user.

In addition, when the user of the refrigerator directly checks a state of food stored in the refrigerator at a predetermined time interval, a door of the refrigerator must be frequently opened and closed, thereby increasing power consumption of the refrigerator more than is necessary.

In addition, a general refrigerator does not provide information related to a remaining amount of food stored therein, and thus, the user may not recognize that a particular food item is running low and should be purchased again, until after it has been completely consumed. Thus, the user of the general refrigerator may go through periods without a particular food item.

In addition, when the user does not directly operate the refrigerator for a long period of time, freshness of food stored in the refrigerator is continuously changed. In this case, it may be necessary for the user to remotely check information related to state of food stored in the refrigerator.

Meanwhile, a sensor used in the refrigerator is generally fixed and coupled to a main body of the refrigerator, so it is difficult to utilize the sensor to sense information of each food. Even though the sensor may be provided to be independent from the main body of the refrigerator, since the sensor is not provided according to various types of food, it is difficult for a control unit of the refrigerator communicating with the sensor to determine a type of food attached to the sensor.

Also, since the user may use a specific sensor for different food groups, smell generated by a specific food group may permeate to or contaminate another food group, and hence, food hygiene may not be guaranteed.

A refrigerator including a sensor for communicating with the refrigerator and a control system thereof, as described in detail hereinafter, addresses these and other deficiencies. The above references are incorporated by reference herein where appropriate for appropriate teachings of additional or alternative details, features and/or technical background.

FIG. 1 is a conceptual view illustrating an example of a refrigerator 1000 related to the present disclosure. An appearance of the refrigerator 1000 may be formed by a refrigerator main body 1100 and doors 1311, 1312, 1321, and 1322. A food storage chamber 1200 is formed within the refrigerator main body 1100. The food storage chamber 1200 may be divided into a refrigerating chamber 1210 and a freezing chamber 1220 according to set temperatures.

The doors 1311, 1312, 1321, and 1322 are connected to the refrigerator main body 1100 forming an appearance of a front side of the refrigerator, and opens and closes a front opening 1100a of the refrigerator main body 1100. The doors 1311, 1312, 1321, and 1322 may be classified as rotational door or a drawer type door according to opening and closing methods, and may be classified according to installation positions.

The display 1700 may be attached to one surface of a door of the refrigerator to display information related to an operation of the refrigerator or food kept in the refrigerator. Also, the display 1700 may be installed to be detachably attached to one surface of a door of the refrigerator, and the display 1700 being attached to the refrigerator and a display 1700a being detached from the refrigerator may display different information.

For example, the display 1700 may detect whether it is detached from or attached to the refrigerator main body, and may switch information to be displayed on the display 1700 or switch an operation mode of the display 1700. In detail, the display 1700 may include a communication unit that performs communication between a sensor present within the refrigerator and a terminal present outside of the refrigerator, thus serving as a gateway between the sensor and the terminal. The communication unit may be referred to as a communication interface, communication module or communication device. In this case, a communication protocol established between the sensor and the display may be different from a communication protocol established between the terminal and the display.

When food is placed in the refrigerator 1000, the display 1700 may output a graphic object including notification information related to the food, state information related to a state of the food, and food information related to the food. In detail, the state information may include information related to a temperature of food, humidity of food, a type of and a generation amount of a gas generated in food, and a weight of food.

Also, the food information may include information related to at least one of a cooking process set for food, a recommended use-by date, a recommended storage temperature, and a recommended storage humidity. The food information may be installed in a sensor control module of the sensor or a storage module or a server as described hereinafter.

Figure 1B:
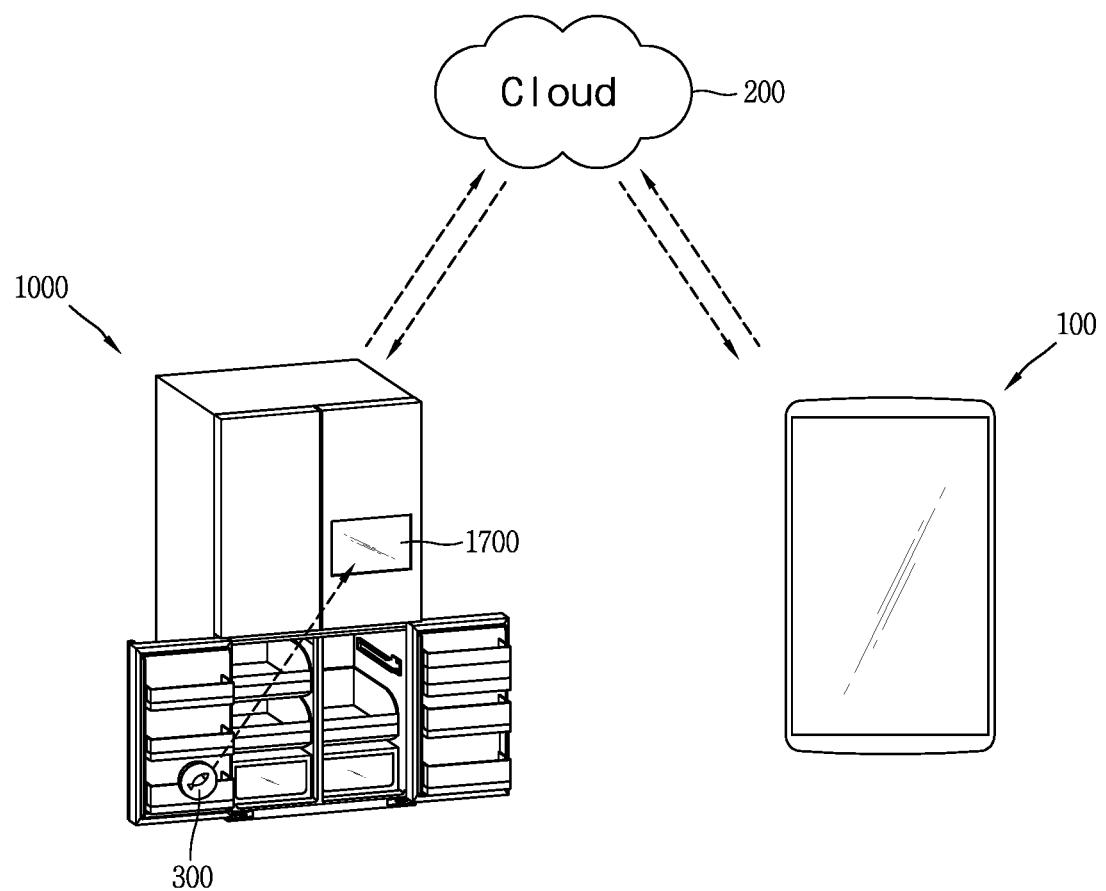
FIG. 1B is a conceptual view illustrating an example of a refrigerator control system related to the present disclosure.

Hereinafter, an embodiment of a refrigerator control system according to the present disclosure will be described with reference to FIG. 1B. A refrigerator control system may include at least one of the refrigerator 1000, a mobile terminal 100, a sensor 300, and a cloud 200 which may include a network and a server. The refrigerator 1000 may receive state information related to a state of food from the sensor 300 attached to the food stored within the refrigerator. The refrigerator 1000 may output notification information related to a storage state of the food on the basis of the state information received from the sensor 300. In addition, the refrigerator 1000 may perform communication with the mobile terminal 100 indirectly through the server 200 or directly perform communication with the mobile terminal 100.

The refrigerator 1000 may receive information related to at least one of a temperature, a weight, a recommended storage period, an expiration date, and a gas generation amount of food from the server 200. The refrigerator 1000 may perform a first communication with the sensor 300, and perform a second communication with the mobile terminal 100 or the server 200. In this case, the first communication and the second communication may be performed based on different communication methods. For example, the first communication may be through Bluetooth and the second communication may be through Wi-Fi.

The sensor 300 may detect a storage start time point at which food starts to be stored in the refrigerator 1000. Also, the sensor 300 may sense state information of food from the storage start time point and transmit the sensed state information to the refrigerator 1000.

The storage start time point at which food with the sensor 300 attached thereto is first stored may be detected by the sensor 300 or may be detected by a refrigerator control unit 1080 (FIG. 2A) using sensed information from the sensor 300. A detailed method for detecting a storage start time point of food will be described in more detail with reference to FIGS. 4A to 4D and 10A to 10E.

The refrigerator 1000 may detect identification information of food on the basis of the sensed information from the sensor 300 and search for information related to at least one of a temperature, a weight, an appropriate storage period, an expiration date, and a gas generation amount of food using the detected identification information. For example, the server 200 may include a database related to food included in various food groups, and the refrigerator 1000 may refer to required information from the database using the detected identification information.

The refrigerator 1000 or the server 200 may perform authentication on the mobile terminal 100, and when a transmission request for information related to food stored in the refrigerator 1000 is received from the mobile terminal 100, the refrigerator 1000 or the server 200 may check whether the mobile terminal 100 which has transmitted the transmission request is an authenticated terminal. Thus, only the authenticated mobile terminal 100 may receive information related to food from the refrigerator 1000.

Figure 2A:
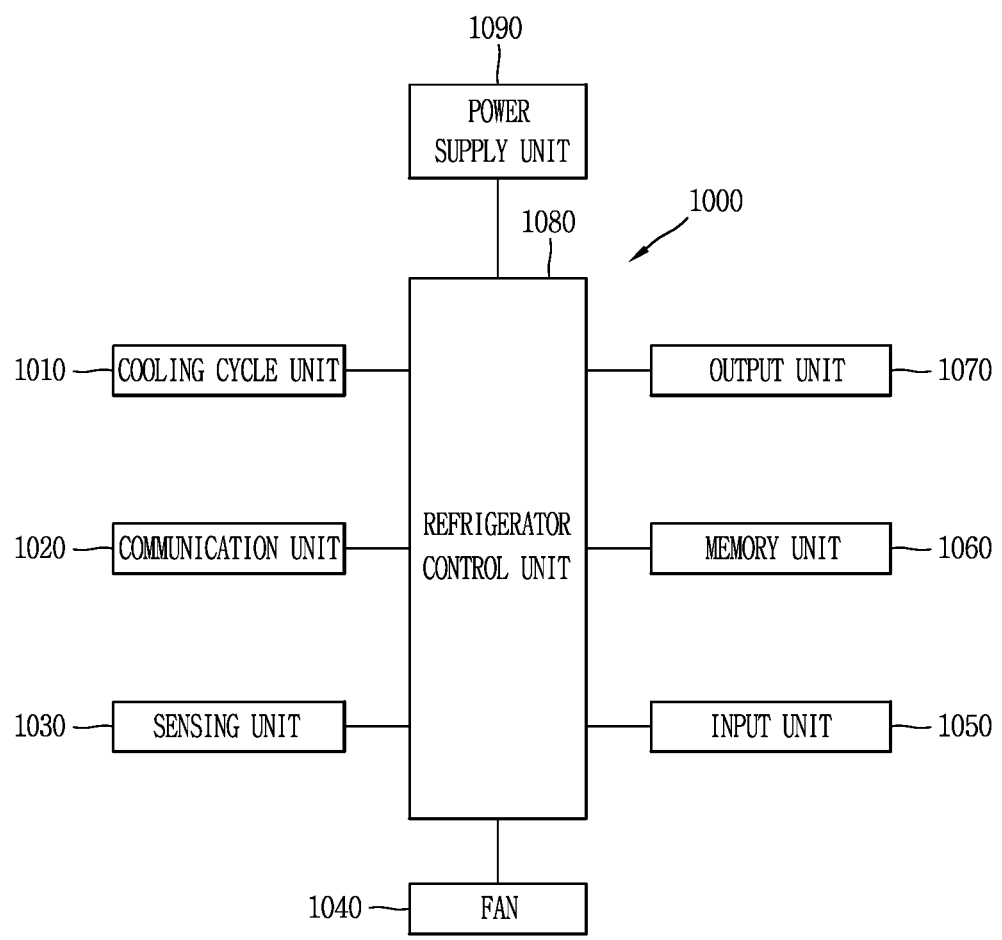
FIG. 2A is a block diagram illustrating components of a refrigerator included in a refrigerator control system according to the present disclosure.

Hereinafter, components of the refrigerator 1000 according to the present disclosure will be described in detail with reference to FIG. 2A. The refrigerator 1000 according to the present disclosure may include at least one of a cooling cycle unit 1010, a communication unit 1020, a sensing unit 1030, a fan 1040, an input unit 1050, a memory unit 1060, an output unit 1070, a refrigerator control unit 1080, and a power supply unit 1090.

In detail, the cooling cycle unit 1010 may be formed as a compressor, a condenser, an evaporator, a dryer, a capillary tube, a hot line, and the like. Also, the cooling cycle unit 1010 may circulate a refrigerant within the cooling cycle unit 1010 according to driving of the compressor.

The communication unit 1020 may include one or more components that allow wired/wireless communication between the refrigerator 1000 and a wired/wireless communication system or wired/wireless communication between the refrigerator 1000 and a network in which the refrigerator 1000 is positioned. For example, the communication unit 1020 may include a broadcast receiving module, a wireless Internet module, a short range communication module, and a position information module. In an embodiment, the communication unit 1020 may be disposed in the display 1700 or the output unit 1070 as illustrated in FIG. 1A.

The wireless Internet module included in the communication unit 1020 refers to a module for wireless Internet connection and may be installed within or outside of the refrigerator 1000. Here, as a wireless Internet technology, a WLAN (Wireless LAN), Wi-Fi, Wibro, Wimax, HSDPA (High Speed Downlink Packet Access), and the like, may be used.

The short range communication module included in the communication unit 1020 refers to a module for short range communication. As a short range communication technology, Bluetooth, RFID (Radio Frequency Identification), IrDA, (infrared Data Association), UWB (Ultra Wideband), ZigBee, and the like, may be used.

The position information module included in the communication unit 1020 may be a module for checking or obtaining a position of a refrigerator. For example, the position information module may be a GPS (Global Position System) module. The GPS module receives position information from a plurality of artificial satellites. Here, the position information may include coordinate information displayed by latitude and longitude. For example, the GPS module may measure accurate times and distances from three or more satellites and accurately calculate a current position from the three different distances according to triangulation or trigonometric calculations. A method for obtaining distance and time information from three satellites and correcting an error by one satellite may be used. In particular, the GPS module may obtain even an accurate time together with 3D speed information, as well as positions of latitude, longitude, and altitude from position information received from the satellites.

The communication unit 1020 may receive data from a user, and may transmit information processed in the refrigerator control unit 1080 of the refrigerator 1000, information sensed in the sensing unit 1030, and the like, to an external terminal.

The sensing unit 1030 may sense a temperature within or outside a storage chamber of the refrigerator, whether the refrigerator door or a home bar is opened, and the like. In detail, the sensing unit 1030 may include a sensor that senses a temperature of at least one of an inlet of an evaporator and an outlet of the evaporator.

Also, the sensing unit 1030 may include at least one sensor attached to one surface within the refrigerating chamber of the refrigerator, at least one sensor attached to one surface within the freezing chamber, and at least one sensor attached to one surface among outer wall surfaces of the refrigerator to sense an ambient temperature. Also, the sensing unit 1030 may include a sensor that senses whether the compressor is driven or senses a cooling capacity of the compressor. Information sensed by the sensing unit 1030 may be transferred to the controller 180.

The fan 1040 may include a cooling fan that supplies cooling air to the inside of the refrigerator, a heat releasing fan disposed in a mechanical chamber to release heat of a refrigerant passing through the condenser of the cooling cycle unit, and the like.

The input unit 1050, which is to receive a user input for controlling an operation of the refrigerator 1000 or checking a state of the refrigerator 1000 and outputting a signal corresponding to the user input, may be implemented in the form of a button or a touch pad.

For example, the input unit 1050 may be implemented in the form of a touch screen on a display of the output unit 1070 of the refrigerator. Also, the input unit 1050 may further include a camera module for capturing an image of a food material to be kept in the refrigerator or capturing an image such as a barcode or a QR code attached to the food material. Also, the input unit 1050 may further include a microphone for inputting audio such as a user's voice.

The memory unit 1060 may store information related to the refrigerator 1000, for example, a program for driving the refrigerator 1000, information set for driving the refrigerator 1000, an refrigerator application, refrigerator state information, recipe information, food material information kept in the refrigerator, user information, multimedia content, and the like, and also include an icon or graphic data for visually expressing such information.

Also, the memory unit 1060 may store at least one of position information regarding a place where the refrigerator 1000 is installed, information regarding one or more terminals whose positions are to be collected, and connection information regarding a server.

The output unit 1070, which is to visually or audibly express information related to the refrigerator 1000, and the like, may include a planar display and a speaker. In detail, the display may be formed as a touch panel for receiving a user's touch input.

The display of the output unit 1070 displays a UI (User Interface) or a GUI (Graphic User Interface) related to driving of the refrigerator. In detail, the display may include at least one of a liquid crystal display, a thin film transistor (TFT) liquid crystal display, an organic light emitting diode, a flexible display, a 3D display. Also, two or more displays may be present according to an implementation form of the refrigerator 1000. For example, a first display may be provided on one surface of a refrigerator door of the refrigerator 1000 and a second display may be provided on one surface of a freezing door.

When the display and a sensor that senses a touch operation (hereinafter, referred to as a "touch sensor") form a layered structure (hereinafter, referred to as a "touch screen"), the display may also be used as an input device, as well as an output device. The touch sensor may have a form of a touch film, a touch sheet, a touch pad, and the like.

The power supply unit 1090 may receive external power or internal power under the control of the refrigerator control unit 1080, and may supply power required for operation of each component.

An operation of the refrigerator control unit 1080 and an operation of an application executed by the refrigerator control unit 1080 may be based on an appropriate mediation operation of an operating system, and a description of the mediation operation will be omitted.

Figure 2B:
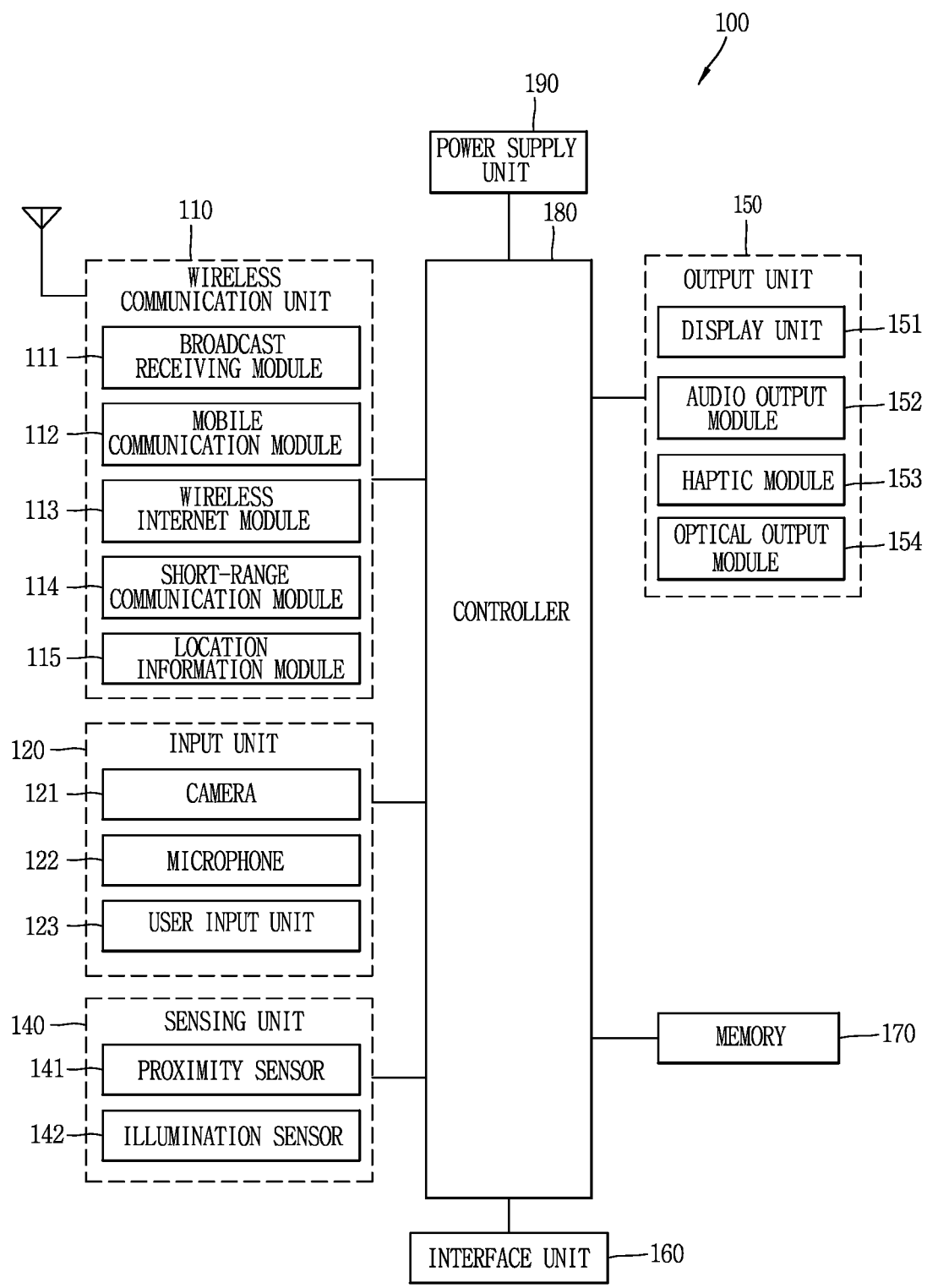
FIG. 2B is a block diagram illustrating components of a mobile terminal included in a refrigerator control system according to the present disclosure.

Hereinafter, components of the mobile terminal 100 included in the refrigerator control system according to the present disclosure will be described in detail with reference to FIG. 2B. The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The mobile terminal 100 may include wireless communication unit 110 configured with several commonly implemented components. For instance, the wireless communication unit 110 may typically include one or more components which permit wireless communication between the mobile terminal 100 and a wireless communication system or network within which the mobile terminal is located.

The output unit 150 may be configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 may serve as an interface with various types of external devices that can be coupled to the mobile terminal 100. In some cases, the mobile terminal 100 may perform assorted control functions associated with a connected external device, in response to the external device being connected to the interface unit 160.

The memory 170 may be implemented to store data to support various functions or features of the mobile terminal 100. For instance, the memory 170 may be configured to store application programs executed in the mobile terminal 100, data or instructions for operations of the mobile terminal 100, and the like.

The controller 180 may function to control overall operation of the mobile terminal 100, in addition to the operations associated with the application programs. The controller 180 may provide or process information or functions appropriate for a user by processing signals, data, information and the like, which are input or output by the various components, or activating application programs stored in the memory 170.

Regarding the wireless communication unit 110, the broadcast receiving module 111 may be configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The display unit 151 may be configured to output information processed in the mobile terminal 100. For example, the display unit 151 may display execution screen information of an application program executing at the mobile terminal 100 or user interface (UI) and graphic user interface (GUI) information in response to the execution screen information. In some embodiments, the display unit 151 may be implemented as a stereoscopic display unit for displaying stereoscopic images.

The audio output module 152 may be configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. A haptic module 153 may be configured to generate various tactile effects that a user feels, perceive, or otherwise experience.

An optical output module 154 may output a signal for indicating an event generation using light of a light source. Examples of events generated in the mobile terminal 100 may include message reception, call signal reception, a missed call, an alarm, a schedule notice, an email reception, information reception through an application, and the like.

The memory 170 may store programs to support operations of the controller 180 and store input/output data (for example, phonebook, messages, still images, videos, etc.). The memory 170 may store data related to various patterns of vibrations and audio which are output in response to touch inputs on the touch screen. Moreover, the mobile terminal 100 may be operated in association with a web storage which performs a storage function of the memory 170 on the Internet.

Various embodiments described herein may be implemented in a computer-readable medium, a machine-readable medium, or similar medium using, for example, software, hardware, or any combination thereof.

Figure 3A:
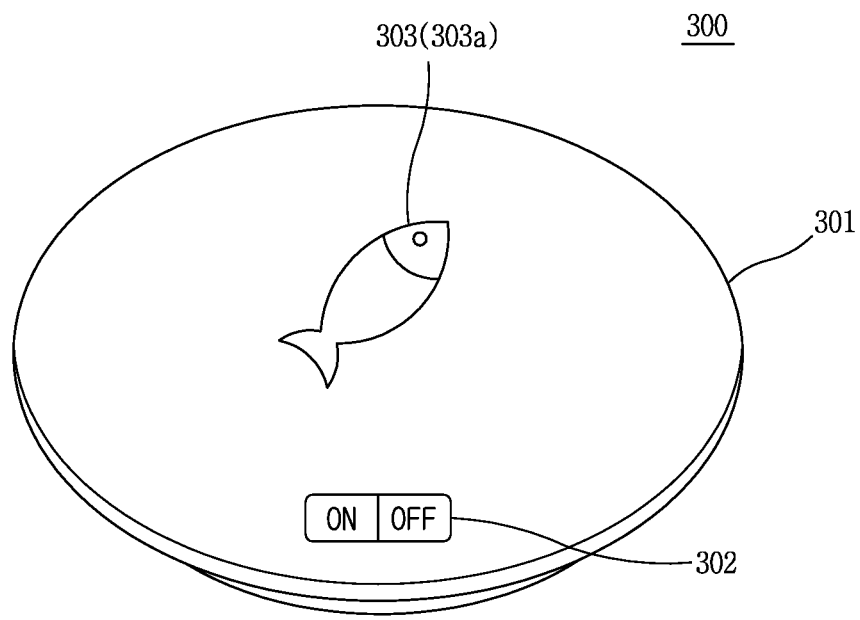
FIG. 3A is a conceptual view illustrating an example of a sensor according to the present disclosure.

Hereinafter, various embodiments related to a sensor according to the present disclosure will be described with reference to FIGS. 3A to 3J. As illustrated in FIG. 3A, the main body 301 of the sensor 300 may have a circular shape. However, an embodiment of the main body 301 is not limited to FIG. 3A and the main body 301 may have various sizes and shapes.

An operation switch 302 of the sensor 300 may be provided in a portion of the main body 301. The sensor 300 may be tuned on or off on the basis of a user input applied to the operation switch 302.

Information 303 (also referred to herein as a mark) related to a type of the sensor 300 may be displayed on one surface of the main body 301. In this case, the type of the sensor 300 may be classified according to a food group. For example, types of the sensor 300 may be classified into seafood, meat, vegetables, fruits, dairy products, grains, fat, and the like.

The information 303 related to a type of the sensor 300 may be displayed in a portion of the sensor that forms an appearance of the sensor and where food is not attached. Thus, since the information 303 related to a type of the sensor 300 is displayed on one surface of the main body 301, a mixed use of a food group to which the sensor 300 is attached may be prevented, and thus, hygiene of foods to be stored in the refrigerator 1000 may be enhanced.

That is, since information 303 related to a type of the sensor is displayed on one surface of the main body 301, the user is induced to attach a certain sensor only to the same food group. In some instances, sensors may be alternately used for different food groups, resulting in a unique smell generated by a specific food group to be transferred to a different food group causing an inconvenience to the user. The information 303 provided on the sensor addresses this problem and resulting user inconvenience.

Various types of sensor 300 illustrated in FIGS. 3A to 3J may be formed as a sensor package, and the plurality of sensor packages may be included in a sensor set positioned outside of the refrigerator. In order to store food in a refrigerator, the user may select a type of sensor 300 from the sensor set and attach the selected sensor to a surface of food or a container accommodating the food. Here, in order to select a sensor corresponding to a food group of the food, the user may check information 303 related to the type of the sensor displayed on one surface of the main body of the sensor.

For example, when the information 303 related to a type of the sensor corresponds to fish among a plurality of food groups, the sensor 300 on which the information 303*a* (FIG. 3A) related to the type of the sensor may be attached to a surface of fish or a container accommodating fish.

Thus, in the plurality of sensor packages disclosed in the present disclosure, the mark 303 including information related to a type of the sensor may be disposed on an outer surface of the main body of the sensor package so that foods are classified according to types of foods and the user is able to quickly recognize a type of food or a food group corresponding to the sensor package. That is, the mark 303 classifying types of food and allowing the user to recognize a type of food allocated to the sensor may be disposed on an outer surface of the sensor package.

A memory of the sensor 300 or a memory of the sensor package may store food information related to the mark 303 disposed on the outer surface of the sensor. The food information may include information related to a food group or a kind of food related to the mark 303.

For example, when a type of the sensor 300 classified according to food groups is fish, the memory may store information related to at least one of a recommended storage temperature, a recommended storage humidity, a recommended storage period, and spoilage condition of fish. In another example, when a type of the sensor 300 classified according to food groups is fish, the memory may store information related to a freezing time, a thawing time, and a cooking method of fish.

Meanwhile, a type of the sensor 300 may be flexibly set. That is, the information 303 related to a type of the sensor 300 displayed on one surface of the main body 301 may be changed on the basis of a user input. For example, when the user applies an input for changing a type of the sensor to the sensor, visual appearance of the information 303 related to a type of the sensor 300 may be changed. Here, an output module may be provided in the main body 301 of the sensor 300, and the output module may display the information 303 related to a type of the sensor 300 on the basis of a user input.

In an embodiment, when a type corresponding to a type of food to be newly stored in the refrigerator is not present among types of sensor classified according to food groups, the user may set a custom type of the sensor 300. For example, the mark 300 including information related to a type of the sensor 300 may be set or changed on the basis of a user input. Also, the sensor 300 may receive information related to at least one of a name, a type, a recommended storage temperature, a recommended storage humidity, and a recommended storage period of food, and the received information may be stored in the memory of the sensor 300. For example, the mark 303 including information related to the type of the sensor 300 may corresponding to an image input by a user input. In another example, the mark 303 may indicate the sensor 300 to be attached to a food group which is not defined in advance.

In another embodiment, a type of the sensor 300 may be classified according to types of sensed information. For example, the sensor 300 may be classified into a temperature sensor, a gas sensor, and a weight sensor.

Figure 3B:
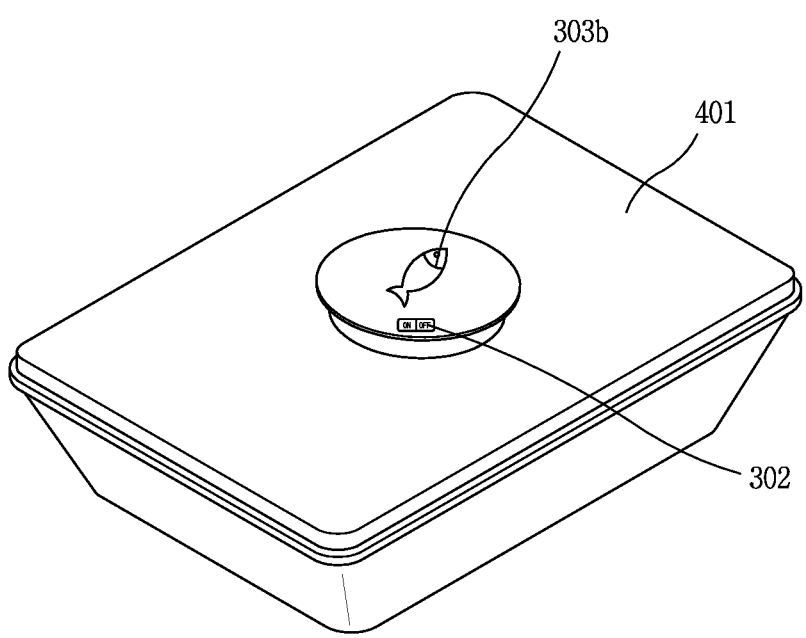
FIG. 3B is a conceptual view illustrating an example in which a sensor according to the present disclosure is attached to food.

Referring to FIG. 3B, an attachment member that generates adhesive force may be provided on a rear surface of the sensor 300, and the sensor 300 may be attached to a container 401 accommodating food by the attachment member. Thus, the sensor 300 may sense a temperature or humidity of food. For example, the sensor 300 to which a mark 303b indicating fish is attached may be attached to a portion of the container 401 accommodating fish. Thus, the operation switch 302 of the sensor 300 may be turned on after the senor 300 is attached to the container 401.

Although not shown in FIG. 3B, the sensor 300 may be directly attached to a surface of food by the attachment member. In this case, the attachment member may be formed of a material which provides adhesive force even on a surface where moisture is present. Thus, the sensor 300 may be directly attached to a surface of food such as meat or seafood.

Figure 3C:
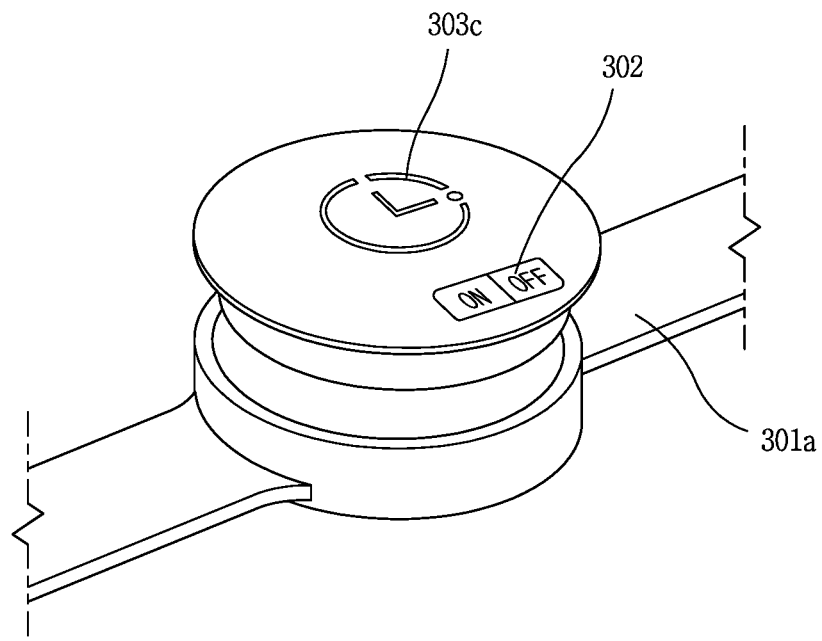
FIGS. 3C and 3D are conceptual views illustrating an example of a band type attachment member provided in a sensor according to the present disclosure.

Referring to FIG. 3C, an embodiment of the sensor 300 having a band type attachment member will be described. Here, the sensor 300 may be coupled to a band type attachment member 301a. The band type attachment member 301a may have a hole in a portion accommodating the sensor 300 to allow the sensor 300 to easily sense information related to a state of food. Thus, in the sensor 300 coupled to the band type attachment member 301a, a portion of the sensor 300 may be exposed to outside by the hole, and the exposed portion of the sensor 300 may be directly in contact with food or a container accommodating food. A length of a band of the band type attachment member 301a illustrated in FIG. 3C may be changed.

Figure 3D:
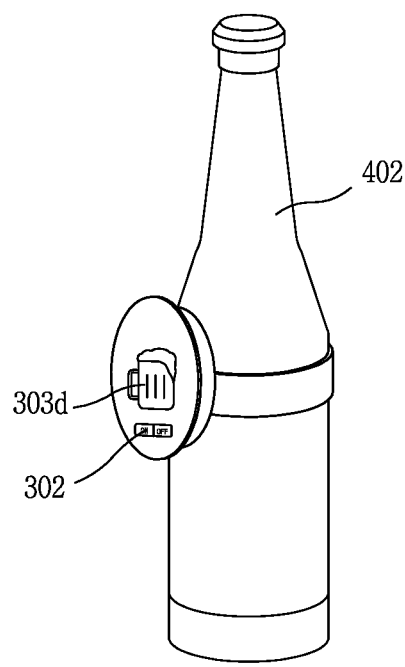

The band type attachment member 301a may be coupled to various types of sensor 300. That is, as illustrated in FIG. 3D, an embodiment in which the sensor 300 with a mark 303d indicating beverage attached thereto and the band type attachment member 301a are coupled is illustrated, and in FIG. 3C, an embodiment in which the sensor 300 with a mark 303c indicating another type attached thereto (e.g., a timer image) and the band type attachment member 301a are coupled is illustrated. The sensor 300 and the band type attachment member 301a may be coupled by magnets attached thereto or may be bound by a binding member.

Also, when the sensor that senses a temperature and the band type attachment member 301a are coupled, one surface on which a heat transmission metal of the sensor 300 is disposed may be exposed to the outside from the band type attachment member 301a.

Also, referring to FIG. 3D, the sensor 300 may be attached to a bottle-shaped container 402 by fastening both ends of the band type attachment member 301a. Meanwhile, although not shown in FIG. 3D, the band type attachment member 301a is not necessarily fastened only to a bottle-shaped container. Thus, the sensor 300 coupled to the band type attachment member 301a may also be attached to various objects such as meat, seafood, and the like.

For example, as illustrated in FIG. 3D, the user may couple the sensor 300 with the mark 303d indicating a beverage type to the band type attachment member 301a, and when the user fastens both ends of the band type attachment member 301a to a bottle accommodating beverage, the sensor 300 may sense information related to a temperature of the beverage. In this case, in order to transmit heat to a first sensing module installed within the sensor 300 and sensing information related to a temperature of food, a metal member installed on one surface of the sensor 300 may be exposed to the outside of the band type attachment member 301a so that the bottle-shaped container 402 accommodating beverage illustrated in FIG. 3D and the metal member may be in direct contact with each other.

The sensor communication module of the sensor 300 illustrated in FIG. 3D may transmit and receive information related to a temperature of the beverage to and from a communication unit of the refrigerator 1000 in real time, and the refrigerator control unit may determine whether the beverage is at an appropriate temperature on the basis of the information related to the temperature of the beverage. That is, on the basis of information received from the sensor communication module of the sensor 300 to which the mark 303d indicating beverage is attached, the refrigerator control unit may sense a temperature of the beverage from a time point at which the beverage is first stored in the refrigerator, receive a set temperature regarding the beverage from the user, and compare the sensed temperature with the set temperature to determine whether the beverage has reached the set temperature. The temperature information may be different based on different types of beverages or based on user set temperatures.

Figure 3E:
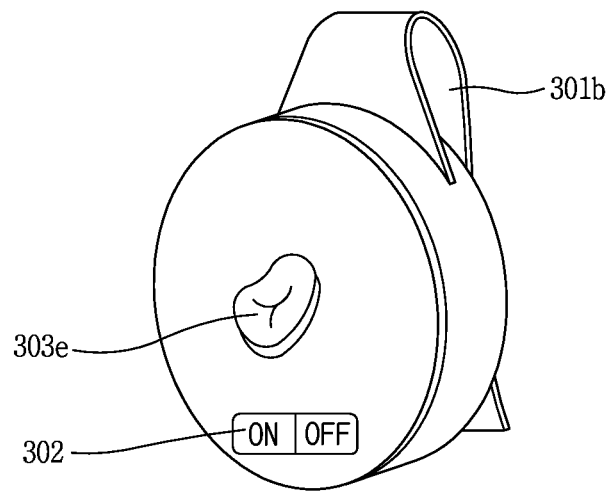
FIGS. 3E and 3F are conceptual views illustrating an example of a clip type attachment member provided in a sensor according to the present disclosure.

Referring to FIG. 3E, an embodiment of the sensor having a clip type attachment member 301b will be described. The sensor 300 may be coupled to the clip type attachment member 301b. In an embodiment, the clip type attachment member 301b may be integrally formed with the main body 301 of the sensor 300 or may be detachably attached to the sensor 300.

For example, the sensor 300 with a mark 303e indicating vegetable and fruit and the clip type attachment member 301b may be coupled to a container. It may be difficult to attach a sensor to certain types of food such as vegetable or fruit food. In this case, the sensor 300 may be attached to a container or bag for such types of food. For example, the clip type attachment member 301b may be fixed to an opening of a vinyl container (e.g., plastic bag), and the sensor 300 attached to the entrance of the vinyl container by the clip type attachment member 301b may sense state information of vegetable or fruit at the opening of the vinyl container. That is, the sensor 300 may be attached to the entrance portion of the vinyl container by the clip type attachment member 301b to sense information related to a gas generated by the vegetable or fruit emitted to the entrance of the vinyl container.

Figure 3F:
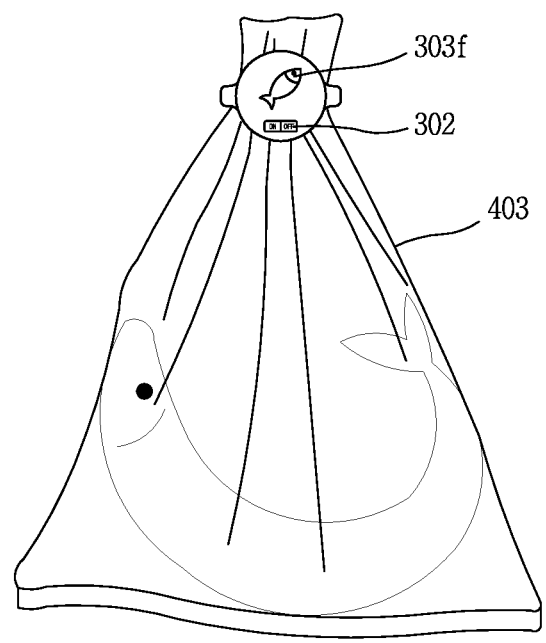

Referring to FIG. 3F, the sensor 300 having the clip type attachment member 301b may be attached to one end of a container 403 accommodating food. In detail, the clip type attachment member 301b may be bound to one end of the container 403. For example, the container 403 may be a vinyl container whose shape can be flexibly changed such as a plastic bag.

As illustrated in FIG. 3F, the sensor 300 with a mark 303f indicating fish attached thereto and the clip type attachment member 301b may be coupled to food to which it is difficult to directly attach the sensor 300 such as fish, in order to sense state information of the fish accommodated in the vinyl container. The clip type attachment member 301b may be fixed to an opening of the vinyl container, and the sensor 300 attached near the opening of the vinyl container by the clip type attachment member 301b may sense state information of fish near the opening of the vinyl container. That is, the sensor 300 may be attached to the open portion of the vinyl container by the clip type attachment member 301b to sense information related to a gas generated by the fish emitted to the entrance of the vinyl container.

Figure 3G:
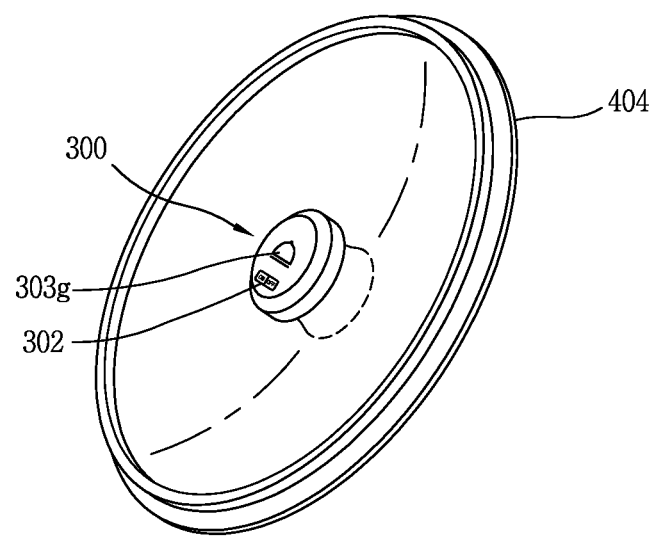
FIGS. 3G and 3H are conceptual views illustrating an example of a sensor attached to a lid of a container accommodating food.
Figure 3H:
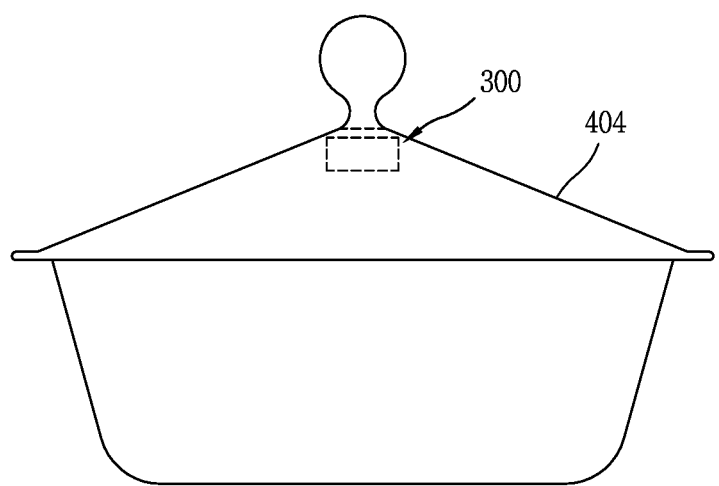

Referring to FIG. 3G, the sensor 300 may be attached to a concave portion formed by a lid 404 of a container accommodating food. The sensor 300 may have an attachment member detachable between the lid and the sensor such that the main body 301 of the sensor 300 may be fixed to the concave portion of the lid. For example, the attachment member may be formed of rubber or silicon and may attach the sensor 300 to the concave portion of the lid. Referring to FIG. 3H, the sensor 300 may be attached to a portion of the lid and positioned within the container accommodating food. Since the sensor 300 is attached to the concave portion of the lid by the attachment member, even when it is difficult to directly attach the sensor 300 to a surface of food, state information related to a state of food may be easily sensed.

In more detail, when a container accommodating food includes a lid, the use may attach the sensor illustrated in FIG. 3G to the lid. The sensor 300 with a mark 303g indicating a lid may be attached to the concave portion of the lid 404. Thereafter, the user may turn on the operation switch 302 of the sensor 300 attached to the lid. In addition, when the user covers the container accommodating food with the lid 404 with the sensor attached thereto, the sensor 300 attached to the lid 404 may sense state information of food accommodated in the container.

Figure 3I:
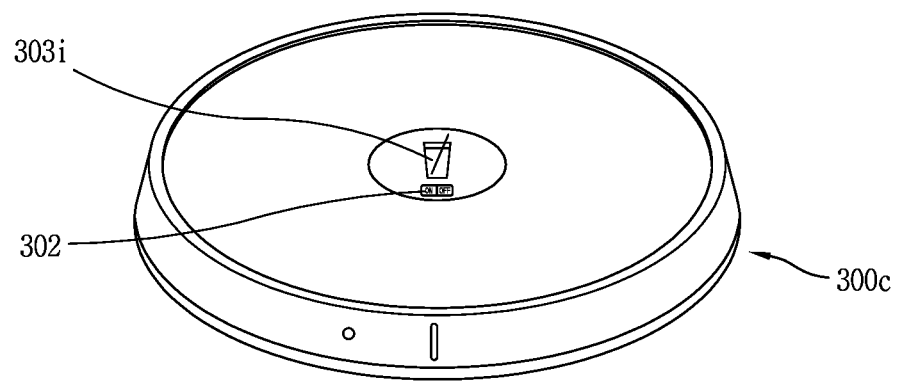
FIGS. 3I and 3J are conceptual views illustrating an example of a sensor that senses a weight of food.
Figure 3J:
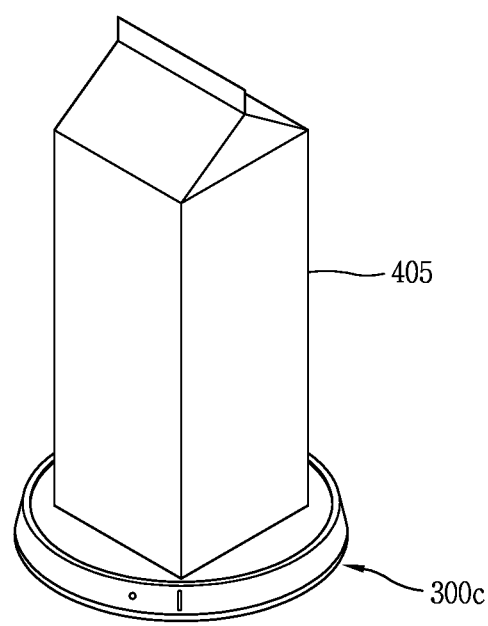

Referring to FIG. 3I, a weight sensor 300c is illustrated as an embodiment of the sensor 300. An upper surface of the weight sensor 300c may be formed to be substantially flat. Referring to FIG. 3J, the weight sensor 300c may be disposed under food or a container 405 accommodating food to sense information related to a weight of the food. In the case of the weight sensor 300c, information related to a power button of the sensor or a type of sensor may be disposed on an outer circumferential surface of a main body of the weight sensor.

For example, a mark 303i indicating a beverage type may be attached to one surface of the weight sensor 300c, and the user may place the weight sensor 300c on a surface inside the refrigerator. Referring To FIG. 1A, the weight sensor 300c may be placed in a receiving space provided in the doors 1311, 1312, 1313, and 1314 of the refrigerator, in a state that the operation switch 302 is turned on. In detail, the receiving space may be provided on an inner side of the door or may be provided on an outer side of the door such that it is opened and closed from outside of the refrigerator.

The weight sensor 300c placed in the receiving space provided in the door may be operated in an inactive mode in a state that food is not placed on the weight sensor 300c. A sensor control module of the weight sensor 300c operated in the inactive mode may determine whether a beverage is placed on the weight sensor 300c.

When a beverage is placed on the weight sensor 300c, the sensor control module of the weight sensor 300c may determine when the beverage is first stored in the refrigerator and detects a time point at which the beverage is stored. Also, when the time point at which the beverage is stored is detected, the sensor control module of the weight sensor 300c may switch the weight sensor 300c from the inactive mode to an active mode to control the weight sensor 300c to sense state information of the beverage. That is, the weight sensor 300c placed in the receiving space provided on the door side of the refrigerator may sense information related to a temperature, weight, and humidity, from a time point at which the beverage is placed on an upper surface of the weight sensor.

Thus, a sensor communication module of the weight sensor 300c may transmit information related to a weight of the beverage in real time or at a predetermined time interval from the time point at which the beverage is first stored in the refrigerator to the communication unit of the refrigerator 1000. On the basis of the information related to the weight of the beverage at the storage start time point received by the communication unit and the weight of the beverage at a current time point, the refrigerator control unit of the refrigerator may determine whether a sufficient quantity of the beverage remains or whether the quantity of the beverage is low and should be purchased.

Also, on the basis of the determination result, the refrigerator control unit may control the display 1700 disposed on a front side of the refrigerator to output a graphic object indicating whether the beverage is insufficient or a graphic object indicating whether the beverage is required to be purchased again. In an example, the refrigerator control unit may compare a weight of the beverage at the storage start time point at which weight sensor 300c was first attached to the beverage and the current weight of the beverage. When the current weight value of the beverage to the weight of the beverage at the storage start time point is less than a predetermined ratio, the refrigerator control unit may determine that the beverage is insufficient or is required to be purchased again. In another example, when the current weight of the beverage is lower than a preset weight value, the refrigerator control unit may determine that the beverage is insufficient or is required to be purchased again.

Also, after the weight sensor 300c detects the storage start point of the beverage, although the sensed weight value is rapidly reduced to substantially converge to 0 g, the refrigerator control unit may defer a determination regarding whether the beverage is insufficient or whether the beverage is required to be purchased again. For example, when the user temporarily removes the beverage from the weight sensor 300c to drink the beverage, even though information related to a rapidly reduced weight value from the weight sensor 300c, the refrigerator control unit may not determine whether the beverage is insufficient or whether the beverage is required to be purchased again for a predetermined period of time.

Here, when a predetermined period of time has lapsed after the weight value sensed by the weight sensor 300c is reduced to 0 g, the refrigerator control unit may determine that the beverage is no longer being stored. When it is determined that the beverage is no longer being stored, e.g., the storage period has come to an end, the refrigerator control unit may control the communication unit of the refrigerator 1000 to transmit a predetermined control command signal to the sensor communication module of the weight sensor 300c to switch the weight sensor 300c to an inactive mode.

The sensor control module of the weight sensor 300c may store information related to a reference ratio value related to a relative ratio used as a reference for determining whether beverage is insufficient or whether beverage is required to be purchased again and information related to an absolute reference weight value. The sensor communication module of the weight sensor 300c may transmit the information related to the reference ratio value or the reference weight value to the communication unit of the refrigerator 1000.

The sensor 300 illustrated in FIGS. 3A to 3J may be coupled to a freshness maintaining member. In detail, the freshness maintaining member may be formed as an oxygen absorbent, an ionizer, or an ultraviolet (UV) generator. For example, referring to FIG. 3H, the freshness maintaining member may be coupled to a portion of the sensor 300 and disposed in a space formed between the sensor and a concave portion of the lid. Also, the freshness maintaining member formed as a UV generator may be installed within the sensor 300.

Figure 4A:
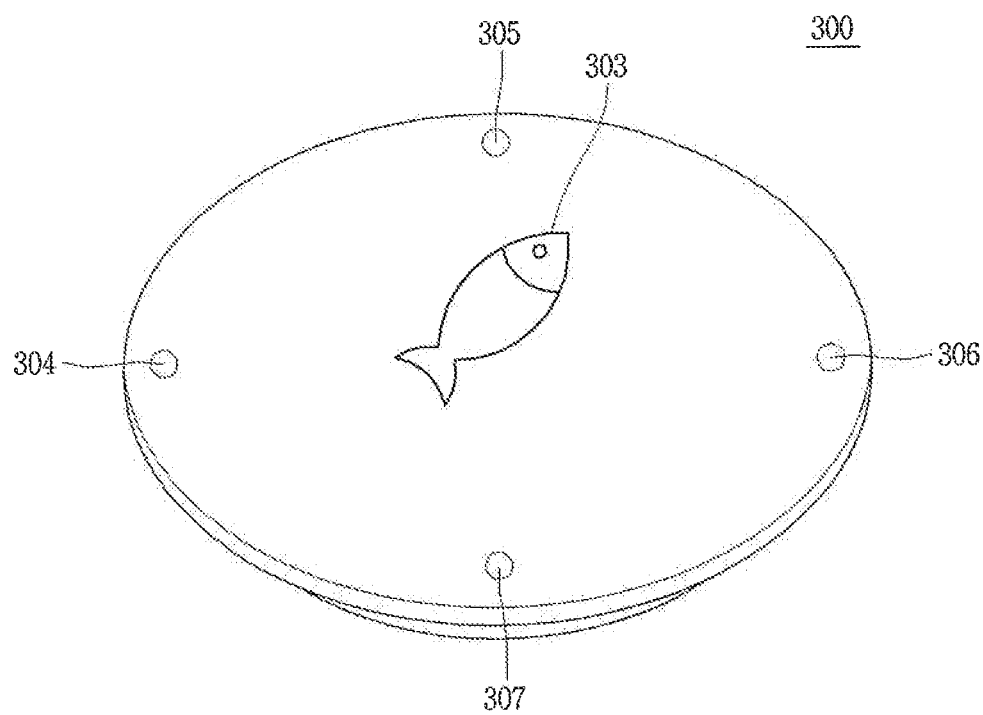
FIG. 4A is a conceptual view illustrating an example of a component disposed on an upper surface of a sensor according to the present disclosure.

Hereinafter, an example of components disposed on an upper surface of the sensor according to the present disclosure will be described with reference to FIG. 4A. At least one of an illumination sensor 304 that senses an amount of light near the sensor, a tact switch 305 (or tactile switch) operated on the basis of a user's touch input, an LED module 306, and a sensing hole 307 allowing a gas generated by food to pass therethrough may be formed on one surface of the sensor 300.

The tact switch 305 may perform a function similar to that of the operation switch 302 illustrated in FIG. 3A. In an embodiment, when a user's touch input is applied, the tact switch 305 may switch an ON/OFF state of the sensor 300. For example, when a touch input is applied to the tact switch 305 in a state that the sensor 300 is ON, the tact switch 305 may turn off the sensor 300, and when the touch input is applied in a state that the sensor 300 is OFF, the tact switch 305 may turn on the sensor 300.

The LED module 306 may output information related to a type of the sensor. In an embodiment, the LED module 306 may output information related to a type of the sensor classified according to food groups. For example, when the sensor 300 is set for meat, the LED module 306 may irradiate a light source of red color, and when the sensor 300 is set for vegetable, the LED module 306 may irradiate a blue light source.

In another embodiment, the LED module 306 may output information related to a type of the sensor classified according to sensing targets. For example, when the sensor 300 is a sensor that senses a temperature, the LED module 306 may irradiate a white light source, and when the sensor 300 is a sensor that senses a gas, the LED module 306 may irradiate a black light source.

In another embodiment, the LED module 306 may output information related to an ON/OFF state of the sensor. In another embodiment, the LED module 306 may irradiate UV light to maintain freshness of food.

Figure 4B:
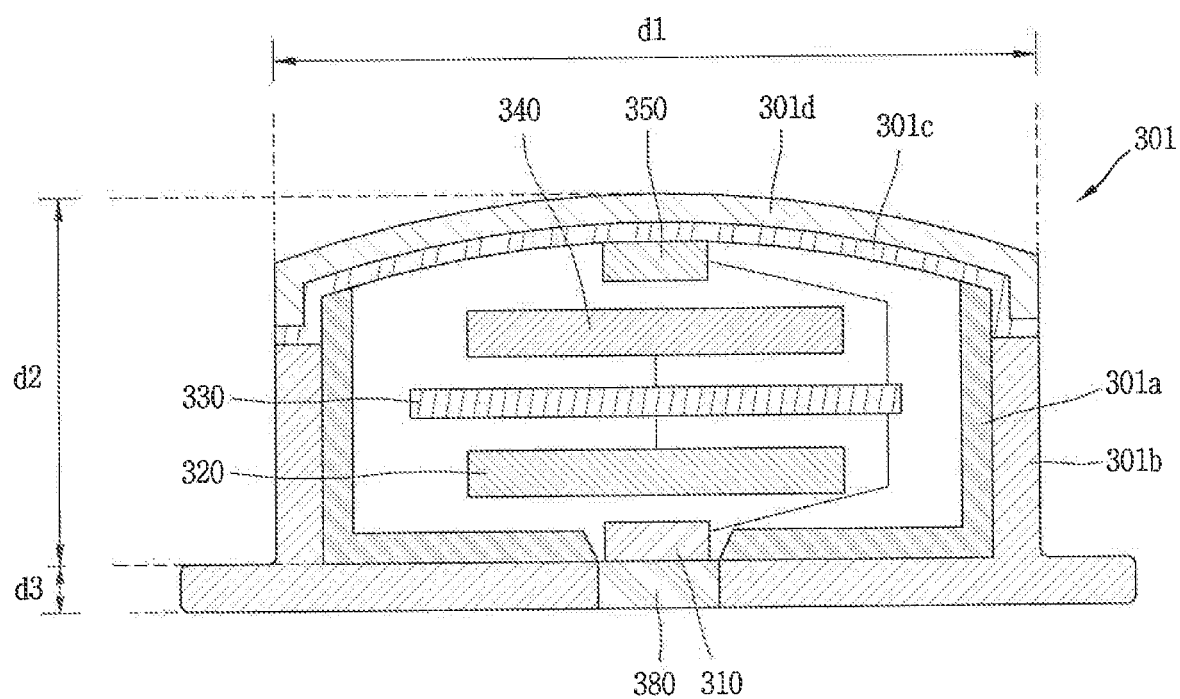
FIGS. 4B to 4D are conceptual views illustrating an example of a main body forming an appearance of a sensor according to the present disclosure and components disposed within the main body.

Referring to FIG. 4B, a plurality of assemblies 301a, 301b, 301c, and 301d forming the main body 301 of the sensor 300 is illustrated. In particular, the sensor 300 illustrated in FIG. 4B may be a temperature sensor for sensing a temperature of food.

Some of the plurality of assemblies 301a, 301b, 301c, and 301d may be formed as insulators. Also, some of the plurality of assemblies 301a, 301b, 301c, and 301d may be formed as waterproof members for preventing penetration of moisture to the inside of the main body. Thus, since the assemblies as waterproof members may form an appearance of the sensor 300, the sensor may be attached even to food containing a large amount of moisture, and a fault of the sensor may be prevented although the sensor 300 may be in contact with moisture for a long period of time.

The main body of the sensor 300 may include at least one of a first sensing module 310 that senses a temperature or humidity, a battery 320 that supplies electric power to the sensor 300, a sensor control module 330 that controls an operation of the sensor 300, a sensor communication module 340 that performs communication with the communication unit of the refrigerator 1000, and a second sensing module 350 that senses an amount of light in the vicinity of the sensor 300.

The first sensing module 310 may be disposed on a rear side of the sensor 300, and may be disposed to be spaced apart from a module that generates heat, among internal modules of the sensor 300. The first sensing module 310 may be installed to be in contact with a conductive member 380 disposed in the assembly 301b forming the main body 301. Here, the conductive member 380 may form a portion of an appearance of the sensor 300 as it may be exposed to the outside of the sensor 300.

The conductive member 380 may transfer heat from food to the first sensing module 310, in order to detect information related to a temperature of food. For example, the conductive member 380 may be formed of a metal with high heat conductivity. In another example, the conductive member 380 may be formed of a metal which does not corrode from contact with food.

Also, the second sensing module 350 may be disposed on an upper surface of the sensor 300, and a portion of the second sensing module 350 may be exposed to the outside. Thus, the second sensing module 350 may detect information related to an amount of light generated on the outside of the sensor.

The sensor communication module 340 may transmit information detected by the first and second sensing modules to the refrigerator 1000, and the refrigerator control unit 1080 may detect information related to a state of food to which the sensor is attached or detect information related to a progress or state of a cooking process performed on the food, on the basis of the transmitted information.

Also, the sensor communication module 340 may transmit information related to a type classified according to food groups of the sensor 300, and information related to a type classified by sensing targets of the sensor 300 to the refrigerator 1000. Thus, the refrigerator control unit 1080 may determine a food group to which the sensor 300 is attached, and determine whether the food is stored at an appropriate temperature according to the determined food group.

For example, the refrigerator control unit 1080 may recognize a position at which food is stored on the basis of information transmitted from the sensor 300. For example on the basis of the information related to a temperature sensed by the first sensing module 310, the refrigerator control unit 1080 may recognize any one of a refrigerating chamber, a freezing chamber, or a room temperature storage chamber as the storage position of food. In another example, the refrigerator control unit 1080 may determine whether the food with the sensor attached thereto has been thawed or whether the food is frozen.

Referring to FIG. 4B, the sensor 301 configured to sense a temperature may be 30-40 mm in width d1 and 10-15 mm in height d2, and a thickness d3 of a rear surface of the sensor 301 may be 1-4 mm. Preferably, the width d1 may be 36.50 mm, the height d2 may be 13 mm, and the thickness d3 of the rear surface may be 2.00 mm.

Figure 4C:
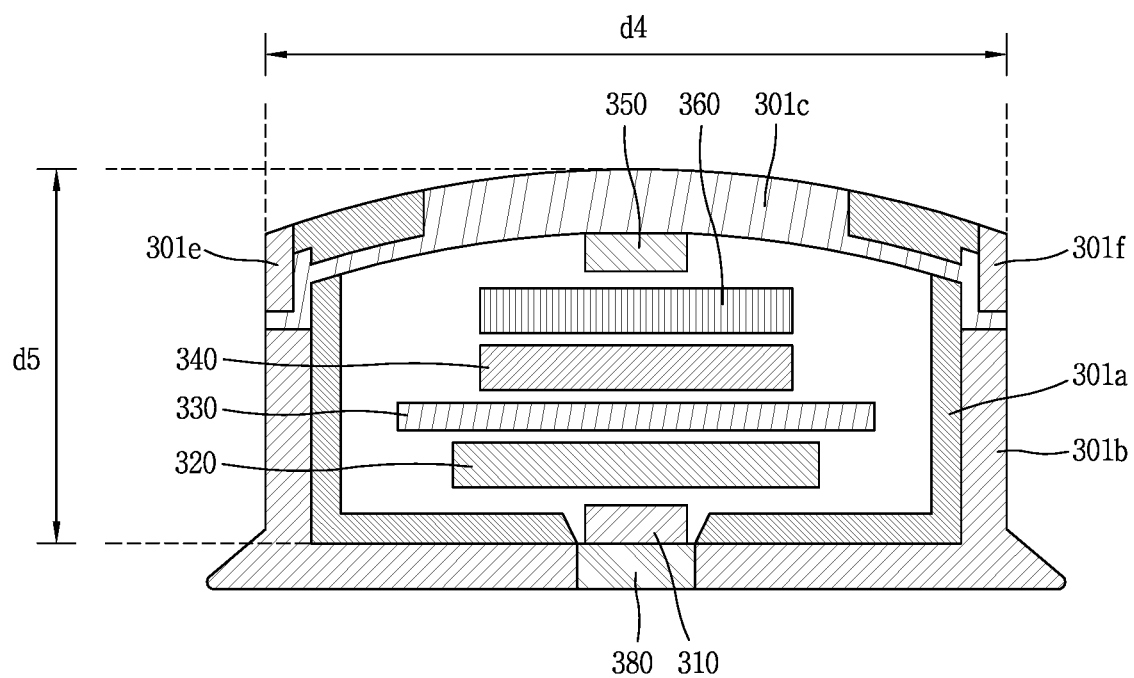

Referring to FIG. 4C, a plurality of assemblies 301a, 301b, 301c, 301e, and 301f that form the main body 301 of the sensor 300 is illustrated. In particular, the sensor 300 illustrated in FIG. 4C may be a gas sensor for sensing gas generated from food.

A sensing hole to allow a gas generated from food to be introduced therethrough may be formed in one assembly 301c forming an appearance of the sensor 300. A third sensing module 360 sensing a gas generated from food may be disposed between the sensor communication module 340 and the second sensing module 350 within the main body of the sensor 300. The third sensing module 360 may detect information related to a type of a gas generated from food and a generation amount of the gas.

As illustrated in FIG. 4C, the sensor configured to sense gas may also equipped with the first sensing module 310 for sensing a temperature. Referring to FIGS. 4B and 4C, the first sensing module 310 may be disposed on a rear surface of the sensor 300, and may be disposed to be spaced apart from a module generating heat among internal modules of the sensor 300. The first sensing module 310 may be installed to be in contact with the conductive member 380 disposed in the assembly 301b forming the main body 301 of the sensor 300. In this case, the conductive member 380 may form a portion of an outer appearance of the sensor 300 as it may be exposed to the outside of the sensor 300. The conductive member 380 may transfer heat to the first sensing module 310, and thus, the first sensing module 310 may detect information related to a temperature of the food.

The sensor communication module 340 may transmit the information detected by the first sensing module 310 and the third sensing module 360 to the refrigerator 1000, and the refrigerator control unit 1080 may detect whether food with the sensor attached thereto has spoiled or information related to a progress or state of a cooking process being performed on the food.

For example, the refrigerator control unit 1080 may determine whether food has been spoiled or whether the food has been matured on the basis of information related to a type of gas generated by the food and an amount of generated gas as sensed by the third sensing module 360. In this case, the refrigerator control unit 1080 may use a database including information related to types of gases generated when food groups are spoiled or matured and amount of the gases generated.

In detail, when the sensor 300 is for meat, if an amount of ammonia gas or amine gas generated is about 5-10 mg %, the refrigerator control unit 1080 may determine that the food to which the sensor is attached is fresh. If the amount of ammonia gas or amine gas is about 15-25 mg %, the refrigerator control unit 1080 may determine that the food to which the sensor is attached is normal. If the amount of ammonia gas or amine gas is about 30-40 mg %, the refrigerator control unit 1080 may determine that the food to which the sensor is attached has started to spoil. If the amount of ammonia gas or amine gas is about 50 mg % or greater, the refrigerator control unit 1080 may determine that the food to which the sensor is attached has completely spoiled.

Referring to FIG. 4C, the sensor configured to sense gas may be 30-40 mm in width d4 and 15-20 mm in height d5. Preferably, the width d4 may be 36.50 mm, and the height d5 may be 16.50 mm.

Figure 4D:
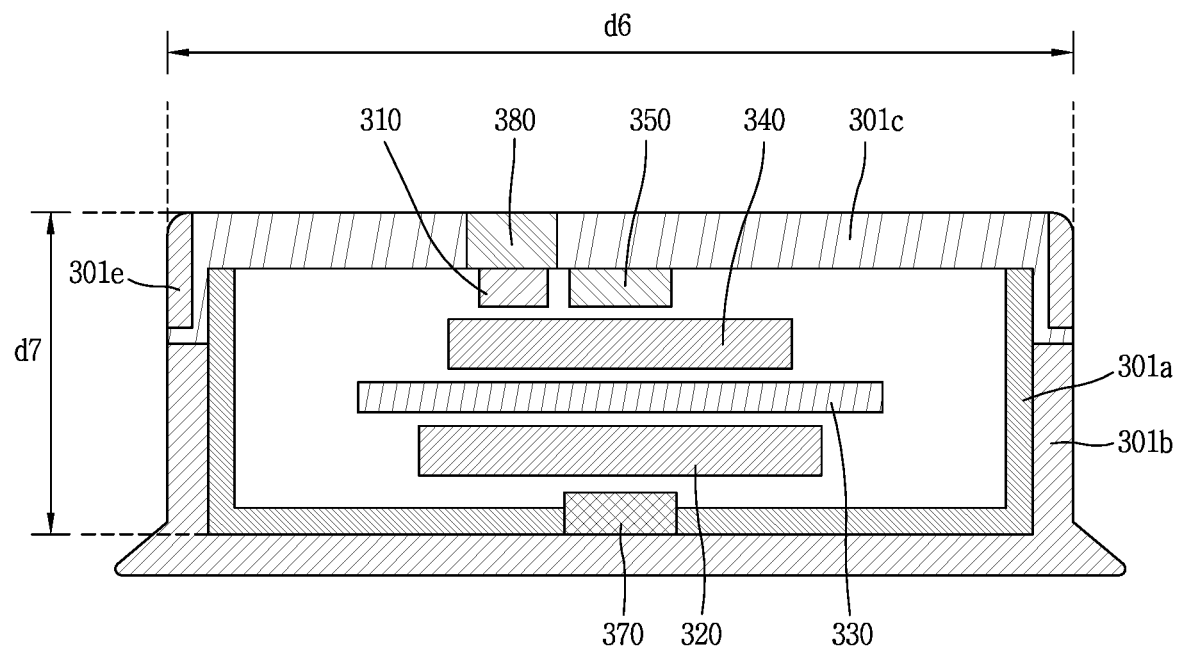

The sensor 300 illustrated in FIG. 4D may be a weight sensor that senses information related to a weight of food. An assembly 301c that forms an upper surface of the main body of the sensor 300 may be formed to be flat. That is, the upper surface of the main body of the sensor 300 may be a portion on which food is placed to measure a weight of the food. Preferably, the assembly 301c that forms the upper surface of the main body may be formed to be substantially planar.

Referring to FIG. 4D, a fourth sensing module 370 that detects information related to a weight of food may be disposed on a rear surface within the main body of the sensor 300. In this case, the battery 320, the sensor control module 330, and the sensor communication module 340 may be sequentially disposed on the fourth sensing module 370. Also, in a case in which the fourth sensing module 370 is disposed on the rear surface within the main body of the sensor 300, the first sensing module 310 and the second sensing module 350 may be disposed on the sensor communication module 340.

Referring to FIG. 4D, in the senor 300 configured to sense weight, the first sensing module 310 that detects information related to a temperature may be installed to be in contact with the conductive member 380 included in the upper surface of the main body 301 of the sensor 300. For example, the assembly 301c that forms the upper surface of the main body 301 may include the conductive member 380 exposed to the outside, and the first sensing module 310 that senses temperature may be installed to be in contact with the conductive member 380. As described above, when an object for weight measurement is placed on the assembly 301c, a temperature of the weight measurement target may be transferred to the first sensing module through the conductive member 380.

The sensor communication module 340 may transmit information detected by the first, second, and fourth sensing module to the refrigerator 1000, and the refrigerator control unit 1080 may detect whether a quantity of food is sufficient or whether the food is required to be purchased again on the basis of the transmitted information.

For example, on the basis of the information received from the fourth sensing module, the refrigerator control unit 1080 may compare a weight of food at a storage start time point and a weight of the food at a current time point. Here, when the weight of the food is reduced by a specific ratio or less, compared with the weight of the food at the storage start time point, the refrigerator control unit 1080 may determine that the food is insufficient or is required to be purchased again. The specific ratio may be set to be different in each food group and/or based on user setting.

Referring to FIG. 4D, a width d6 of the sensor configured to sense weight may be 60-100 mm and a height d7 may be 10-15 mm. Preferably, the width d6 may be 90 mm and the height d7 may be 12 mm.

When the sensors illustrated in FIGS. 4B to 4D are compared, the sensor configured to sense weight may be formed to be larger in width than the sensor configured to sense temperature or gas. Also, the sensor that senses gas may be formed to be higher in height than the sensor that senses temperature or weight.

As described above, FIGS. 4B to 4D illustrate the sensor that senses temperature, the sensor that senses gas, and the sensor that senses weight, respectively. Each type of sensors may include the first sensing module 310 that senses a temperature related to food, regardless of sensor types. Thus, the sensor may detect information related to a temperature of food or a temperature within the refrigerator, regardless of a type (e.g., a temperature, a humidity, a gas, a weight, etc.) of information as a sensing target, and may detect a storage start time point of food by using the detected information.

As described above, in FIGS. 4B to 4D, the relative disposition of the first sensing module 310 to third sensing module 370 are illustrated, but components of the sensor according to the present disclosure are not limited to the disclosed relative disposition illustrated in FIGS. 4B to 4D. Various components of the sensor may have alternative dispositions based on the intended application.

Hereinafter, application of various types of sensors 300 described above with reference to FIGS. 3A to 3I and 4A to 4D will be described. In an embodiment, when food such as meat is first stored in the refrigerator, the sensor 300 having a mark 300 related to meat is attached to food or a container accommodating the food. When an operation switch 302 of the attached sensor 300 is turned on, the sensor control module 330 may detect whether the food with the sensor 300 attached thereto is stored in the refrigerator. The sensor control module 330 may switch an operation mode of the sensor 300 from an OFF mode to an inactive mode on the basis of a user input applied to the operation switch 302. Here, the sensor control module 330 of the sensor operated in the inactive mode may control the battery 320 to supply minimum electric power required for detecting whether food is stored in the refrigerator to an internal component of the sensor 300.

In order to detect whether food with the sensor 300 attached thereto is stored in the refrigerator, the sensor control module 330 uses information sensed from at least one of first to fourth sensing modules. When the sensor control module 330 detects a storage start time point of food using at least one of the first to fourth sensing modules, the sensor control module 330 switches the sensor 300 to an active mode. For example, when a storage start time point of food is detected, the first to fourth sensing modules of the sensor 300 starts to sense state information for a type of food (e.g., meat).

Also, the sensor communication module 340 may transmit information related to a recommended storage temperature, a recommended storage humidity, and a recommended storage period of meat stored in the sensor control module 330 to the communication unit of the refrigerator 1000. Also, the sensor communication module 340 may transmit state information of food sensed by the first to fourth sensing modules at a predetermined time interval or in real time to the communication unit of the refrigerator 1000.

Accordingly, the refrigerator control unit of the refrigerator 1000 may detect that food with the sensor 300 attached thereto is stored in the refrigerator and may process information related to the type of the food to be stored, the recommended storage temperature, the recommended storage humidity, and the recommended storage period according to the type. Also, the refrigerator control unit of the refrigerator 1000 may process state information of the food with the sensor 300 attached thereto, determine whether the food has spoiled using the state information, or calculate a remaining retention period of the corresponding food.

The sensor 300 illustrated in FIGS. 4A to 4D may detect a storage start time point at which food starts to be stored within the refrigerator 1000. For example, the sensor 300 may detect a time point at which a user input is applied to the operation switch 302 or the tact switch 305 provided in a portion of the main body 301 as the storage start time point.

Also, an illumination sensor or the second sensing module 350 of the sensor 300 may detect information related to an amount of light irradiated to a point of the main body 301, and detect a storage start time point on the basis of the detected amount of light. In an embodiment, when an amount of light irradiated to one point of the main body 301 is less than or equal to a reference light amount value, the sensor control module 330 may detect a time point at which the irradiated amount of light is reduced to this level, and determine the detected time point as a storage start time point of the food.

Figure 10A:
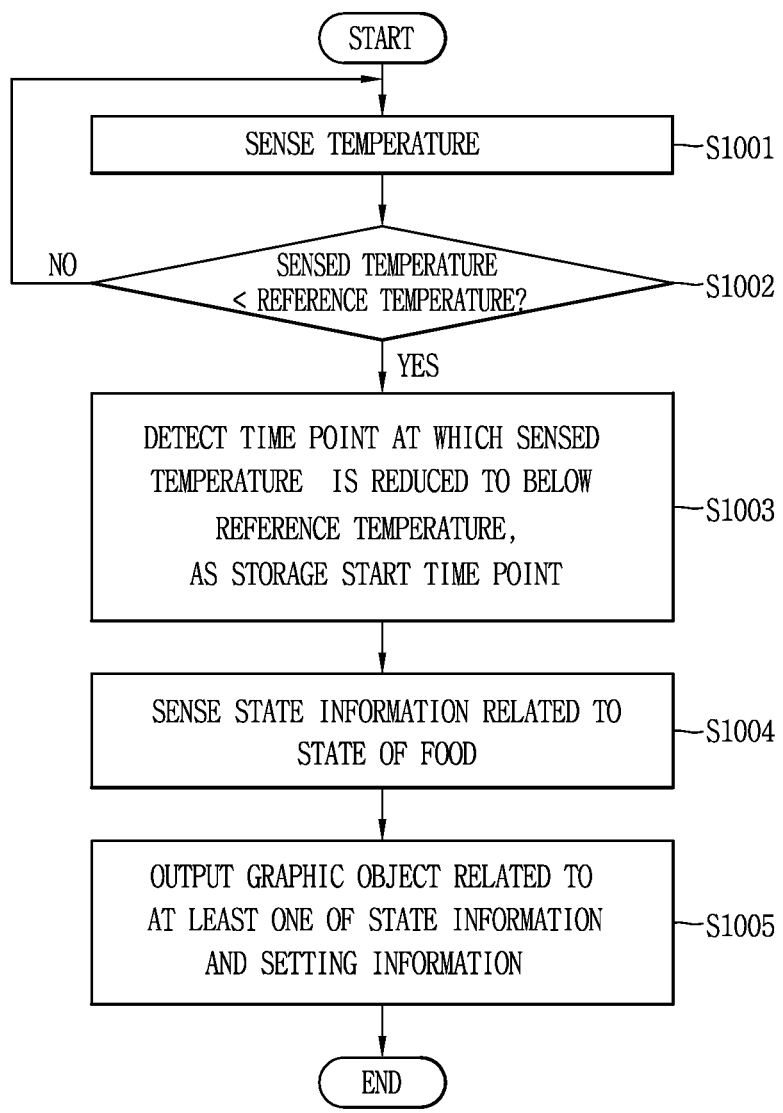
FIGS. 10A to 10E are flow charts illustrating embodiments related to a method for detecting a time point at which food attached to a sensor package starts to be stored within a refrigerator using a sensor package according to the present disclosure.
Figure 10B:
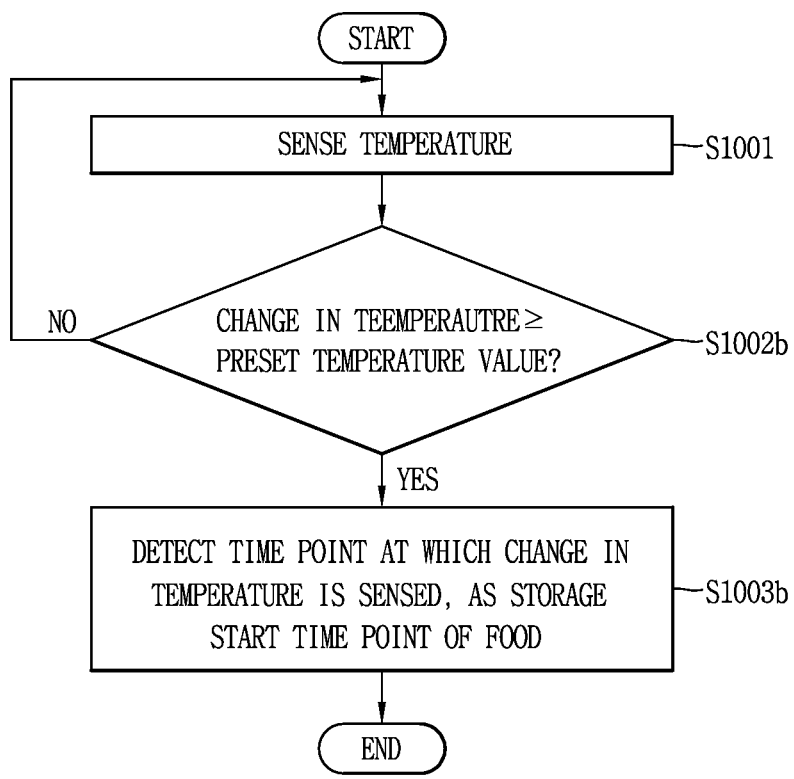
Figure 10C:
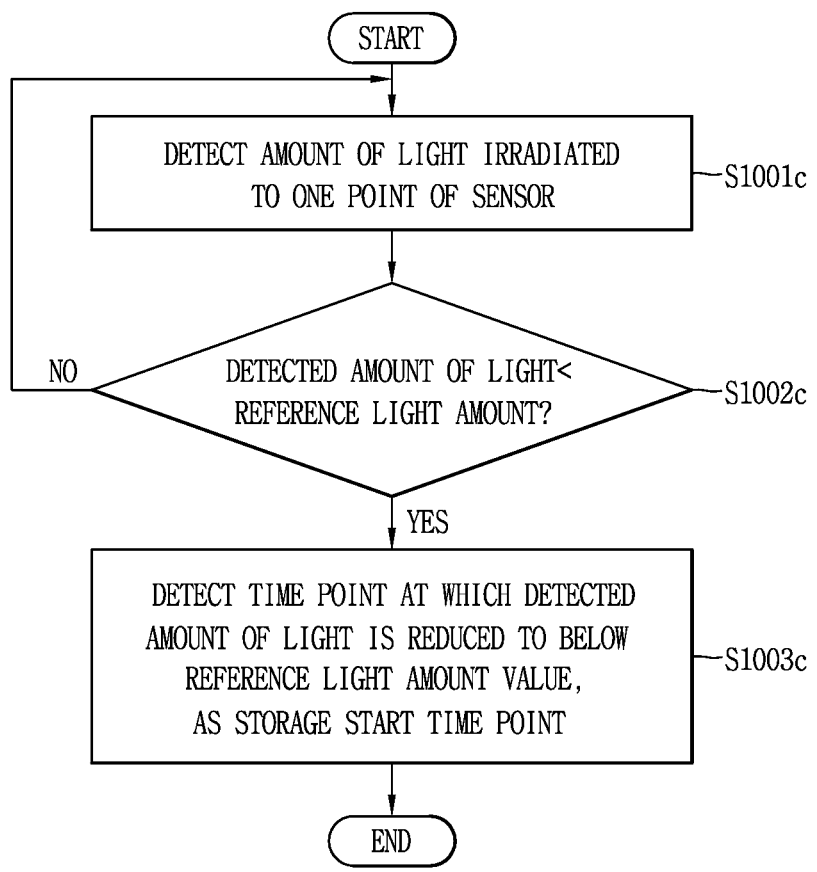

FIG. 10C is a flow chart illustrating a process to detect a time point at which food is first stored based on the detected amount of light. The illumination sensor or the second sensing module 350 may detect information related to an amount of light irradiated to one point of the main body 301, in step S1001c.

The sensor control module 330 may determine whether an amount of light irradiated to one point of the main body 301 is less than a reference light amount value, in step S1002c. Also, the sensor control module 330 may detect a time point at which an amount of light is reduced to below the reference light amount value, and determine the detected time point as a storage start time point of food, in step S1003c.

In another embodiment, when an amount of light irradiated to one point of the main body 301 is greater than or equal to a first light amount reference value, the sensor control module 330 of the sensor 300 may determine that storing of food has not started, and operates the sensor 300 in an inactive mode.

The battery 320 of the sensor 300 in the inactive mode may supply electric power only to a component for sensing an amount of light irradiated to one point among internal components of the sensor 300. Meanwhile, the battery 320 of the sensor 300 in an OFF state may cut off power supply to all the internal components of the sensor 300.

Also, when an amount of light irradiated to one point of the main body 301 is less than a second light amount reference value, the sensor control module 330 of the sensor 300 may determine that storing of food has started. That is, the sensor control module 330 may detect a time point at which the amount of light irradiated to one point is reduced to be less than the second light amount reference value, as a storage start time point of food. After detecting the storage start time point, the sensor control module 330 may operate the sensor 300 in an active mode.

When an amount of light irradiated to one point is reduced from a value higher than the first light amount reference value to a value smaller than the second light amount reference value within a preset time interval, the sensor control module 330 may detect a time point at which the irradiated amount of light dropped to below the second light amount reference value as a storage start time point. Here, the first and second light amount reference value may be changed or adjusted. In an example, the first light amount reference value may be set to be higher than the second light amount reference value.

Also, the weight sensor or the third sensing module 370 of the sensor 300 may sense information related to a weight of an object placed on the main body 301 of the sensor 300, and the sensor control module 330 may detect a storage start time point of food on the basis of information related to the weight. In detail, the sensor control module 330 may detect a time point at which the weight sensed by the weight sensor or the third sensing module 370 has been changed by more than a preset weight value as a storage start time point of food. When a change in weight greater than a preset weight value is sensed within a preset time interval, the sensor control module 330 may detect a time point at which the change in weight is detected as a storage start time point of food.

Figure 10D:
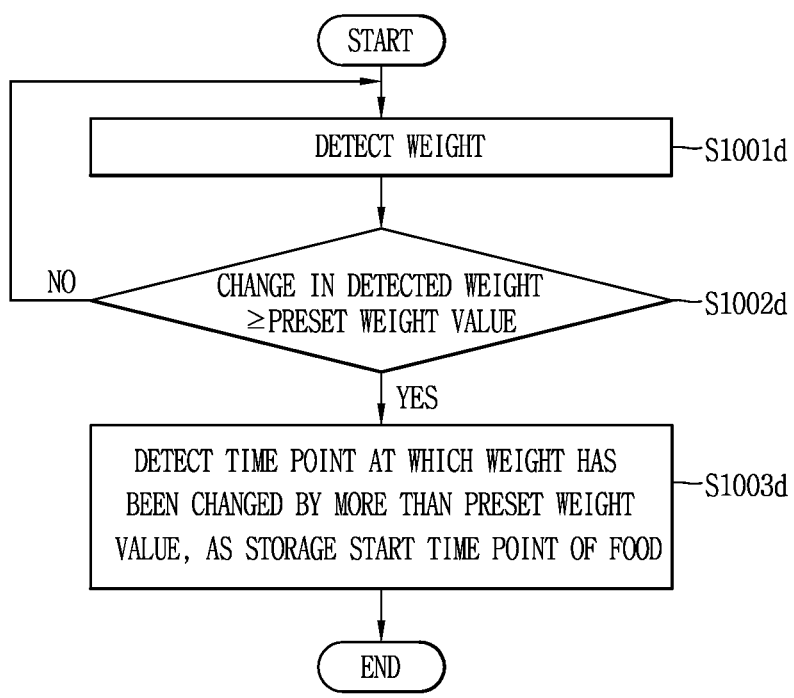

FIG. 10D is a flowchart illustrating a process to detect a storage start time point based on detected weight of food. The weight sensor or the third sensing module 370 may detect a weight applied to the sensor, in step S1001d. For example, the weight sensor or the third sensing module 370 may detect a weight applied to the sensor at predetermined time intervals.

The sensor control module 330 may calculate a change in weight applied to the sensor, and determine whether the calculated change in weight is greater than or equal to a preset weight value, in step S1002d. Also, the sensor control module 330 may detect a time point at which the detected weight is changed by more than the preset weight value as a storage start time point of food, in step S1003d. Meanwhile, before the storage start time point of food is detected, the sensor control module 300 may operate the sensor 300 in an inactive mode.

Also, the temperature sensor or the first sensing module 310 of the sensor 300 may sense information related to a temperature sensed by the sensor 300, and the sensor control module 330 may detect a storage start time point of food on the basis of the information related to the temperature. In detail, the sensor control module 330 may detect a time point at which the sensed temperature is reduced to below the reference temperature value, as a storage start time point of food. Here, the sensor communication module 340 may receive information related to a set temperature of the refrigerating chamber or the freezing chamber of the refrigerator 1000 from the communication unit 1020, and the sensor control module 330 may set the reference temperature value on the basis of the set temperature.

FIG. 10A is a flowchart of a process to detect a storage start time point based on sensed temperature. The temperature sensor or the first sensing module 310 may sense a temperature at a portion of the sensor 300 in contact with the conductive member 380, in step S1001. Here, the temperature sensing period may be changeable and, preferably, the temperature sensor or the first sensing module 310 may sense the temperature in real time. Thereafter, the sensor control module 330 may determine whether the sensed temperature is reduced to below a reference temperature value, in step S1002. For example, the reference temperature value may be directly set by the user.

In another example, the sensor control module 330 may set a reference temperature value according to types classified according to food groups of the corresponding sensor. That is, the sensor control module 330 may set different reference temperature values when the corresponding sensors are a sensor for meat and a sensor for fruit.

The sensor control module 330 may include a sensor memory module that stores information related to a type of a preset sensor, and the sensor control module 330 may set a reference temperature value using information related to the stored type of a sensor. Also, the sensor memory module may store information related to at least one of an appropriate storage period in the refrigerating chamber, an appropriate storage period in the freezing chamber, an appropriate storage temperature, and a notification message to be output when the appropriate storage period has elapsed.

In another example, the sensor control module 330 may set the reference temperature value using information related to refrigerating chamber set temperature or freezing chamber set temperature received from the communication unit 1020. In addition, the sensor control module 330 may detect a time point at which the sensed temperature is reduced to below the reference temperature value as a storage start time point of food, in step S1003. In an embodiment, when a change in temperature greater than the preset temperature is sensed, the sensor control module 330 may detect the time point at which the temperature change was sensed as a food storage start time point.

FIG. 10B is a flowchart of this process to detect the storage start time point based on the detected change in temperature. An initial temperature may be sensed, in step S1001. The sensor control module 330 may calculate a temperature variation using a temperature sensed at a predetermined time interval, and determine whether a temperature change exceeds a preset temperature value, in step S1002b. Thereafter, when the sensor control module 330 detects a temperature change greater than a preset temperature value, the corresponding time point is detected as a storage start time point of food. For example, the sensor control module 330 may reset a reference value regarding a temperature change according to a refrigerator chamber setting temperature and a freezing chamber setting temperature.

Also, when battery charging for battery 320 has completed or stopped, the sensor control module 330 may detect a time point at which charging is stopped as a storage start time point of food. Also, when the sensor communication module 340 establishes communication with the communication unit 1020 of the refrigerator 1000, the sensor control module 330 may detect a time point at which communication is established between the sensor communication module 340 and the communication unit 1020 as a storage start time point of food.

Also, when a time point at which communication between the sensor control module 330 and the communication unit 1020 is established is within a predetermined amount of time after battery charging has stopped, the sensor control module 330 may detect a time point at which communication is established, as a storage start time point of food.

In the above examples, embodiments in which the sensor 300 detects a storage start time point of food using various types of information has been described, but the method for detecting the storage start time point is not limited thereto. Moreover, it should be appreciated that the aforementioned embodiments may not in all cases be independently performed, but the sensor 300 may use a plurality of parameters to determine whether food storage has started. That is, the sensor 300 may set a weight value of information related to a temperature change, a weight change, a light amount change, and the like, and detect a storage start time point of food on the basis of the set weight values.

Figure 10E:
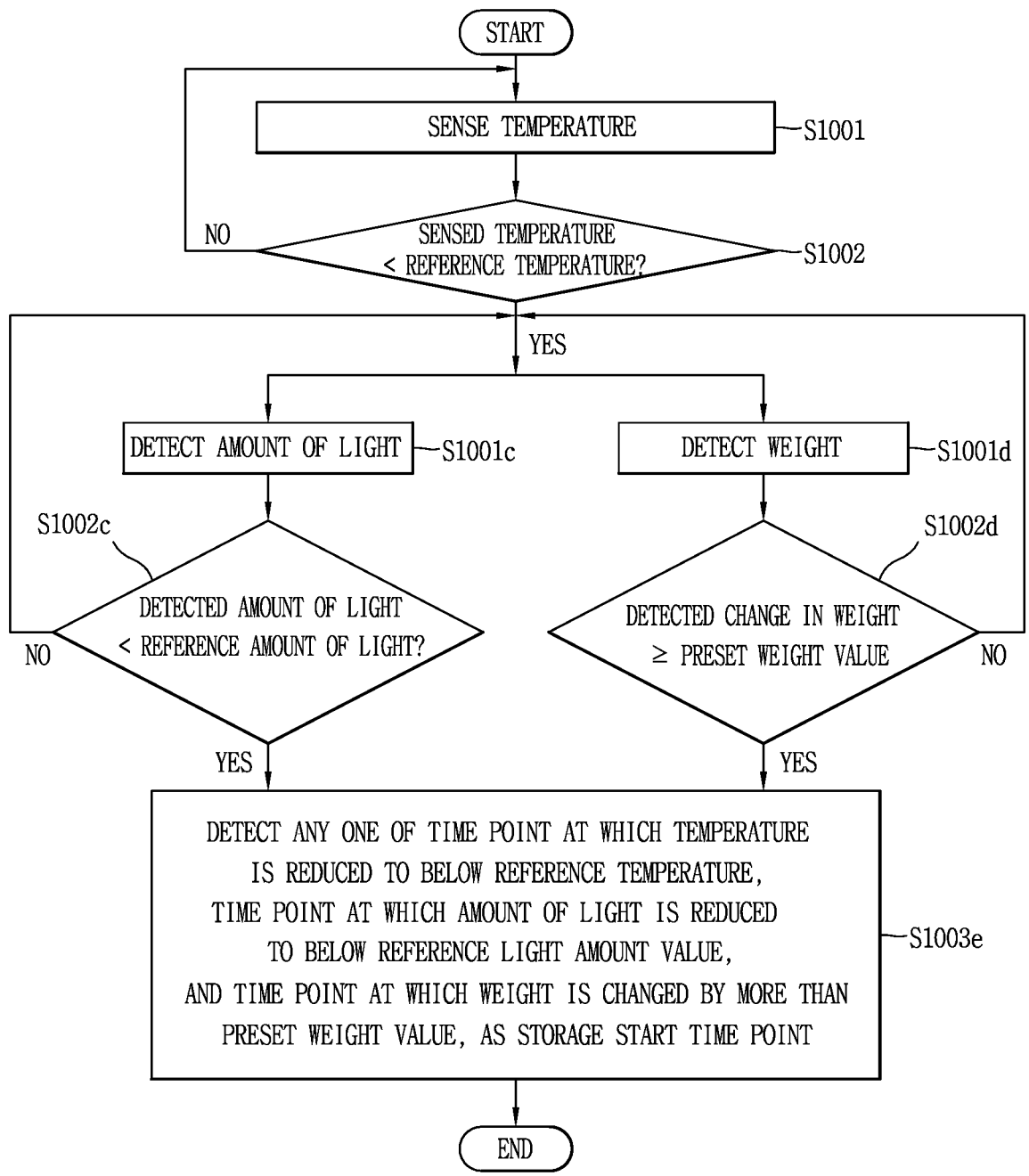

FIG. 10E is a flowchart illustrating a process to detect a storage start time point based on multiple sensed parameters. The sensor control module 330 may primarily determine whether a temperature sensed in a temperature sensing step S1001 is a reference temperature value or lower, in step S1002. Thereafter, when the sensed temperature is determined to be lower than the reference temperature value, the sensor control module 330 may determine whether a detected light amount in step S1001c is less than a reference light amount value, in step S1002c, determine whether a detected weight in step S1001*d* is greater than or equal to a reference with value, in step S1002*d*.

Thereafter, the sensor control module 330 may detect any one of a time point at which a temperature is reduced to below a reference temperature, a time point at which an amount of light is reduced to below a reference light amount value, and a time point at which a weight has changed by more than a preset weight value, as a storage start point of food, in step S1003*e*. Preferably, the sensor control module 330 may determine a storage start point on the basis of preset weight values of temperature, amount of light, and weight as a storage start time point or may determine a first or last detected time point among time points related to the aforementioned three parameters as a storage start point.

Also, in the aforementioned embodiments, the refrigerator control unit 1080 of the refrigerator 1000 may detect a storage start time point of food using various information sensed by the sensor 300. When the refrigerator control unit detects a storage start time point, the refrigerator control unit 1080 may detect a storage start time point of food using information related to opening and closing of a door of the refrigerator 1000, together with the aforementioned change in weight, temperature, and an amount of light.

As mentioned above, since the sensor control module 330 of the sensor 300 or the refrigerator control unit 1080 of the refrigerator 1000 may detect a storage start point of each food stored in the refrigerator, even when the user does not apply a separate setting input, the refrigerator control unit 1080 may detect whether food has been newly introduced to the refrigerator 1000 and detect a storage start point of the corresponding food. Thus, the user of the refrigerator 1000 may obtain an effect of monitoring information related to a state of each food kept in the refrigerator in real time.

Hereinafter, an embodiment related to a main screen including state information of food displayed on a display unit of the mobile terminal included in the refrigerator control system according to the present disclosure will be described.

Figure 5A:
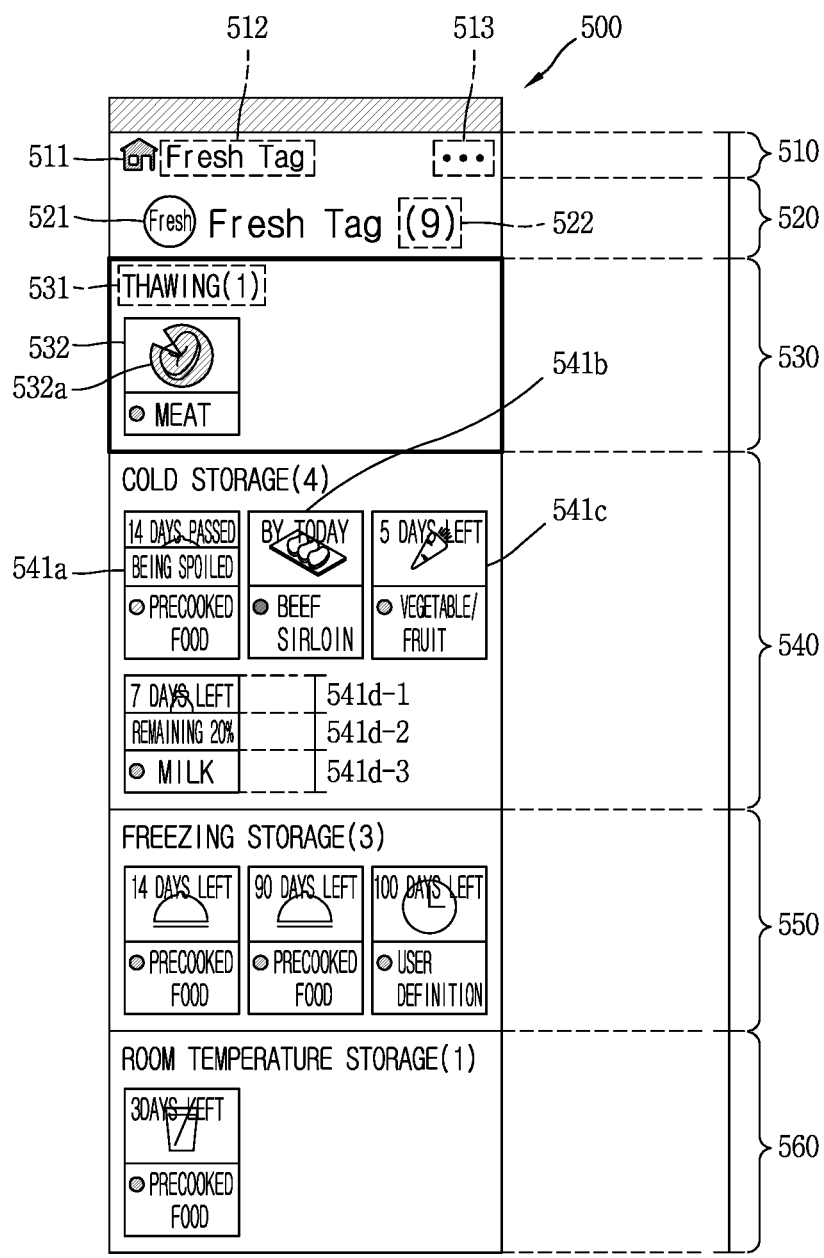
FIGS. 5A to 5C are conceptual views illustrating an example related to a main screen including state information of food, displayed on a display unit of a mobile terminal included in a refrigerator control system according to the present disclosure.
Figure 5B:
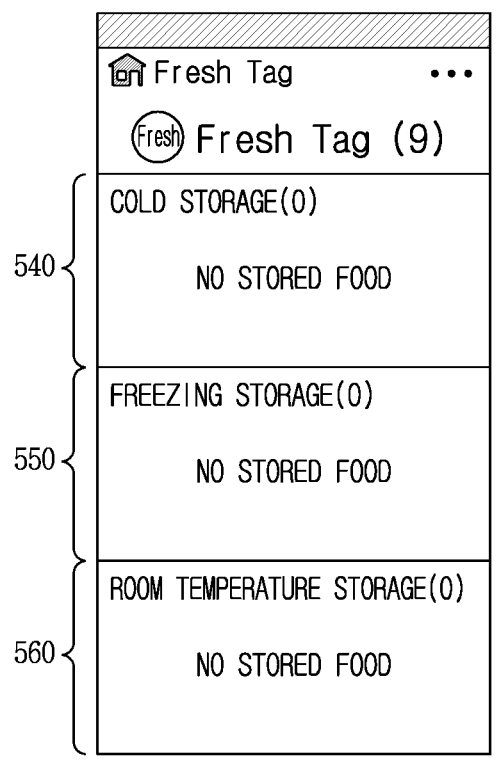
Figure 5C:
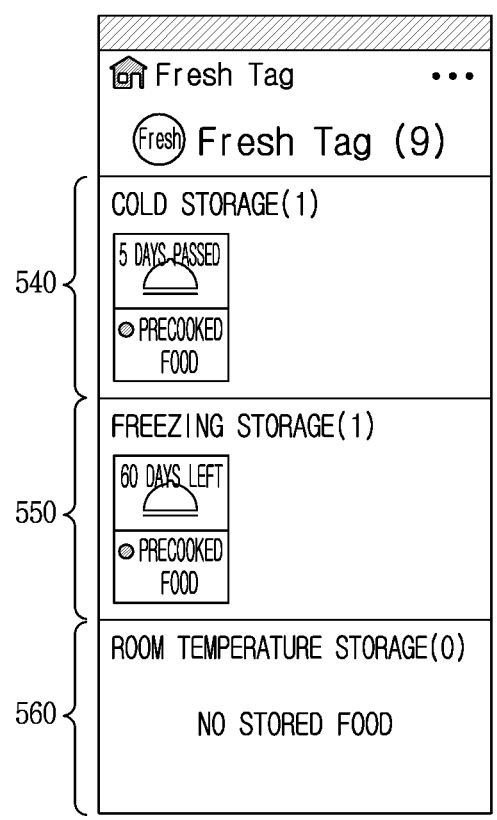

Some of a screens displayed in FIGS. 5A to 5C may be displayed on the display unit 151 of the mobile terminal 100, and a portion displayed on the display unit 151 may be changed according to a user's input. For example, a portion of a screen displayed on the display unit 151 may be changed according to a drag input, but for the convenience of description, only one screen is illustrated in FIGS. 5A to 5C.

Referring to FIG. 5A, when a predetermined application for checking status of food in a refrigerator is executed in the mobile terminal 100, the controller 180 may control the display unit 151 to output a main screen 500 of the application. The main screen 500 may include at least one of a first region 510, a second region 520, a third region 530, a fourth region 540, a fifth region 550, and a sixth region 560.

Information related to a main title of the application may be displayed in the first region 510. For example, the first region 510 may include at least one of a home button 511 for displaying a main screen of the application, information related to a main title 512 of the application, and a setting menu button 513 of the application.

For example, when a touch input is applied to the home button 511 output on the display unit 151, the controller 180 may control the display unit 151 to output a main screen 500. For example, the home button 511 may be output as illustrated in FIG. 5A even when a different screen related to another application is output, and when a touch input is applied to the home button 511, the controller 180 may control the display unit 151 to output the main screen 500.

At least one of an icon 521 related to an application and information 522 related to the number of sensors 300 disposed in the refrigerator 1000 may be displayed in the second region 520. The information 522 related to the number of the sensors 300 may correspond to the number of foods stored in the refrigerator 1000.

Pieces of information 531, 532, and 532*a* related to food on which a predetermined cooking process is performed may be displayed in the third region 530. Here, at least one information 531 related to a name of a cooking process, information 532 related to a progress of the cooking process, and information 532 related to a type of target food may be output in the third region 530. For example, the cooking process may include a thawing (defrosting) process of each food group, a process of adjusting a certain temperature of food to a specific temperature, a process of making ice, creating a thin layer of ice in a container, or another appropriate type of process based on the desired application.

In another example, the controller 180 may update information related to a degree of performing a cooking process in real time. In particular, when the cooking process is a thawing process, display of information related to food on which a cooling process is being performed displayed in the third region 530 may be stopped, and a graphic object related to the corresponding food may be displayed in the fourth region 540 for displaying cold storage food. In another example, information 531 related to a name of a cooking process may include information related to food corresponding to the cooking process or the number of sensors.

The communication unit 110 of the mobile terminal 100 may receive identification information of the sensor 300 attached to food under a predetermined cooking process from the communication unit 1020 of the refrigerator 1000. Using the received identification information, the controller 180 may determine whether the predetermined cooking process is being performed regarding the sensor 300 corresponding to the received identification information.

When different cooking processes are being performed on a plurality of foods stored in the refrigerator 1000, the controller 180 may control the display unit 151 to display pieces of information 531, 532, and 532*a* related to food under the cooking processes. For example, the controller 180 may divide the third region 530 to display information sensed by the sensor 300 according to each cooking process.

In the fourth region 540, graphic objects 541*a*, 541*b*, and 541*c* related to state information sensed by the sensor 300 attached to each refrigerated food. In this case, the controller 180 may determine whether a corresponding food has spoiled based on state information of food sensed by the sensor 300 attached to the refrigerated food (cold storage food).

The sensor 300 may sense information related to gas generated by the food, and the controller may determine whether the food to which the sensor 300 is attached has spoiled upon receiving information related to the gas from the communication unit 1020 of the refrigerator 1000. For example, the controller 180 may receive information related to a type and amount of a gas generated when each food group spoils from the server 200, or may receive information related to a type and amount of a gas generated when each food group spoils from the memory 170 or the memory unit 1060. Also, based on information related to a gas generated by the food to which the sensor 300 is attached, the controller 180 may determine whether the corresponding food to which the sensor is attached has spoiled.

When it is determined that the food has spoiled, the controller 180 may output a graphic object 541*a* representing that the corresponding food has spoiled. When it is determined that the corresponding food has not spoiled, the controller 180 may output graphic objects 541*b* and 541*c* related to a remaining period up to a time point at which the corresponding food is predicted to spoil.

For example, when it is determined that the corresponding food has not spoiled, the controller 180 may compare a storage start time point of food detected by the sensor 300 attached to the corresponding food and a current time point, and output graphic objects 541*b* and 541*c* related to a recommended storage period and a remaining period relative to an expiration date.

Referring to FIG. 5A, in the fifth region 550, a graphic object related to state information sensed by the sensor 300 attached to each of frozen foods (freezing storage foods) may be displayed. Here, the controller 180 may determine whether a corresponding food has spoiled or a time point at which the corresponding food is predicted to spoil on the basis of state information of the food sensed by the sensor 300 attached to the frozen food (freezing storage food). Also, in the sixth region 560, a graphic object related to state information sensed by the sensor 300 attached to each food stored at room temperature may be displayed.

The main screen 500 illustrated in FIG. 5A may include the graphic objects respectively corresponding to foods stored in the refrigerator 1000. Thus, in order to output the main screen 500, the memory unit 1060 of the refrigerator 1000 or the memory 170 of the mobile terminal 100 may store a database including information related to at least one sensor 300 present within the refrigerator 1000.

The database may include a plurality of data having identification information of the sensor 300 as an index, and the plurality of data may include state information related to a state of food sensed by each sensor 300 and food information related to food. In an example, the identification information of the sensor 300 may include information related to a type of sensor classified according to each food group and a unique ID allocated to each sensor.

In another example, the state information may include information related to at least one of a surface temperature of food, a temperature and humidity of the inside of a container accommodating food, a type and an amount of gas generated by food, and a weight of food. The state information may be updated in real time, and state information sensed at a time point at which food is first stored in the refrigerator may be stored separately.

In another example, the food information may include information related to a cooking process set for food. Also, the food information may include information related to at least one of recommended use-by date, a recommended storage temperature, recommended storage humidity, or another appropriate type of information.

For example, the database may include information related to a temperature and humidity of food, a generated gas, and a weight of food at a current time point, as well as information related to a temperature and humidity of food, a generated gas, and a weight of food at a time point at which food is first stored in the refrigerator 1000. Also, such information may be classified for each sensor 300 and stored. Thus, the controller 180 of the mobile terminal 100 may use the database in order to output the main screen 500 including a graphic object related to currently stored food.

Each of the graphic objects related to foods displayed in the third to sixth regions may correspond to each food, and includes an image related to food. For example, an image related to food may be set as a default image according to types of sensors attached to each food, and may be changed to a unique image according to a user input.

As illustrated in FIG. 5B, when food under a cooking process is not present within the refrigerator 1000, the controller 180 may control the display unit 151 not to display the third region 530 in the main screen 500. In another example, even when there is no food for cold storage, food for freezing storage, or food stored at room temperature within the refrigerator 1000, the controller 180 may display the fourth to sixth regions and control the display unit 151 to output a message indicating that there is no food stored in each region. The controller 180 may divide the main screen 500 to include at least one of the third to sixth regions.

Referring to FIG. 5C, whenever food is stored in the refrigerator, the controller 180 may detect a position in which food is stored, and control the display unit 151 to add a graphic object related to the food to a partial region of the main screen 500 corresponding to the detected position. For example, the controller 180 may detect a position in which food is stored using information set in the sensor 300. That is, here, the sensor may be classified as a sensor for cold storage, freezing storage, and room temperature storage, and an appropriate sensor may be attached according to a position in which food is to be stored.

In another example, the controller 180 may detect a position in which food is stored on the basis of information sensed in a position detection module disposed in the sensor 300. In another example, the controller 180 may detect whether a sensor 300 has been introduced from an image captured by a camera installed in the refrigerating chamber, the freezing chamber, or a room temperature storage chamber of the refrigerator 1000, and detect a position in which food is stored accordingly.

In another example, when it is determined that a new sensor 300 has been introduced to the inside of the refrigerator 1000, the controller 180 may output on the display unit 151 to output a window for receiving a user input related to a position in which food is stored. Here, the controller 180 may set information related to a position in which food is stored based on the user input applied to the window.

Figure 6A:
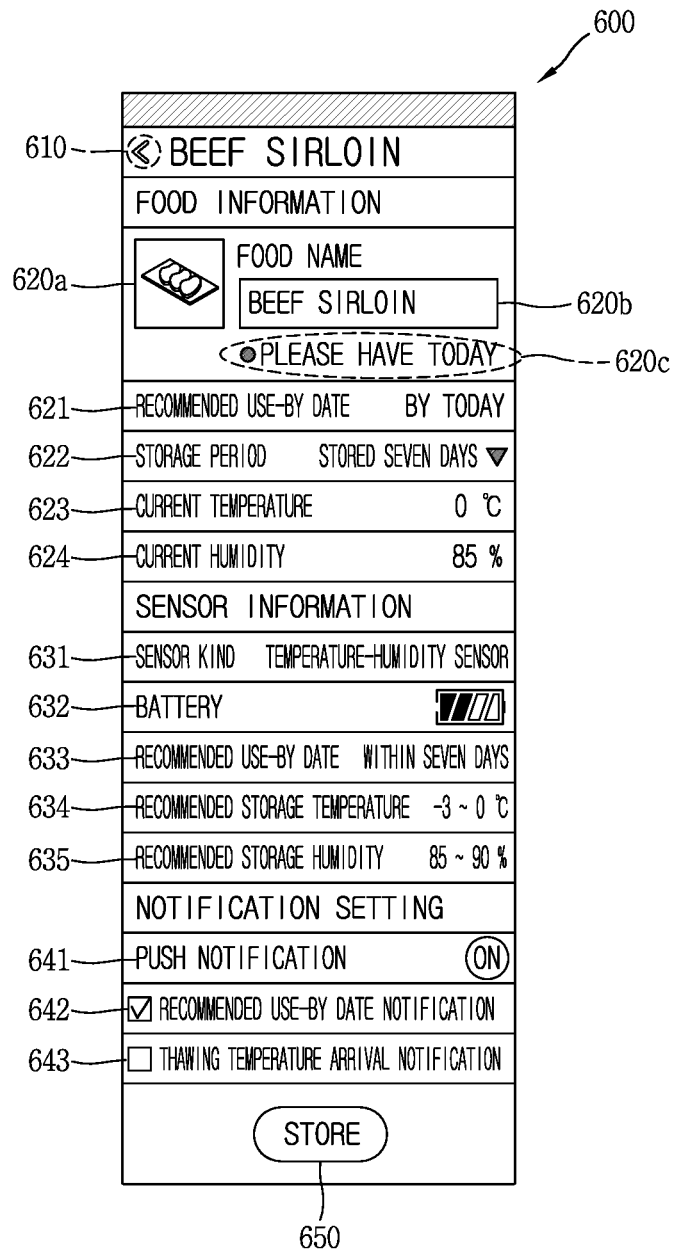

FIGS. 6A to 6F illustrate various embodiments related to a sub-screen including state information of food displayed on the display unit of the mobile terminal included in the refrigerator control system according to the present disclosure. As illustrated in FIG. 6A, when a touch input is applied to at least one graphic object included in the main screen 500 illustrated in FIG. 5A, the controller 180 may switch the output main screen 500 to a sub-screen 600.

The sub-screen 600 may include a return button 610 for returning to the main screen 500. Also, the sub-screen 600 may include pieces of information 620*a*, 620*b*, and 620*c* related to food corresponding to the graphic object applied to the touch input. For example, information related to food may include information related to an image 620*a* of food, a name 620*b* of food, and a recommended use-by date 620*c*.

Also, the sub-screen 600 may include at least one of information 621 related to a recommended use-by date of food, information 622 related to a storage period, information 623 related to a current temperature of food, and information 6254 related to a current humidity around food.

Also, the sub-screen 600 may include pieces of information 631, 632, 633, 634, and 635 related to a sensor attached to food. For example, the sub-screen 600 may include a type 631 of sensor, a remaining battery power 632, a recommended use-by date 633 of the sensor, a recommended storage temperature 634 of the sensor, and a recommended storage humidity 635 of the sensor.

Also, the sub-screen 600 may include pieces of information 641, 642, and 643 related to a notification setting related to food. For example, the sub-screen 600 may include a button 641 that allows the user to select whether to receive a notification about food and check boxes 642 and 643 that allows the user to select whether to receive a notification regarding whether a state of foods satisfies a specific condition. For example, the specific condition may be a condition regarding whether the food has reached a thawing temperature, or whether a storage period of food has reached a recommended use-by period.

Figure 6B:
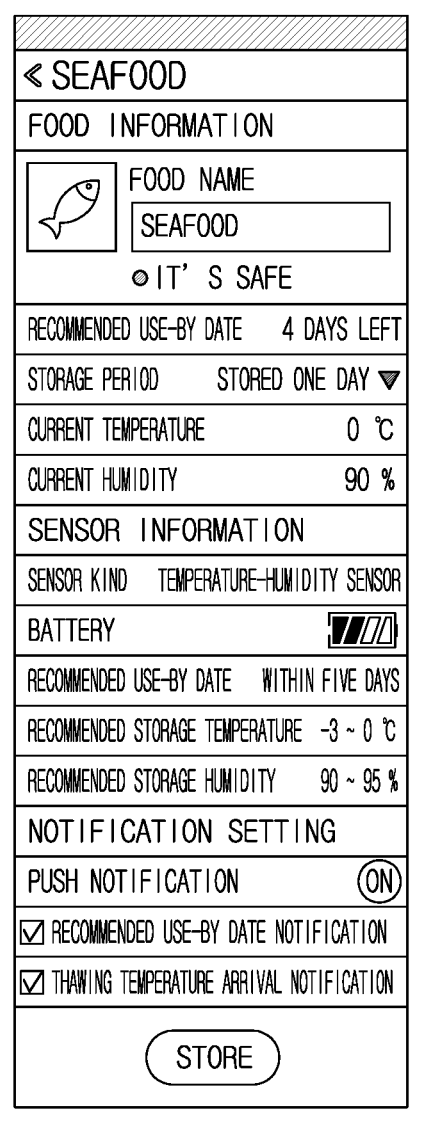

Similarly, referring to FIG. 6B, in the case of the sub-screen 600 corresponding to a different type of food from FIG. 6A, pieces of information 620a, 620b, and 620c related to a graphic object to which a touch input was applied, pieces of information 631, 632, 633, 634, and 635 related to a sensor attached to food, and pieces of information 641, 642, and 643 related to a notification setting related to the food may also be different from the pieces of information illustrated in FIG. 6A.

Referring to FIGS. 6C and 6D, when the sensor 300 attached to food corresponding to the graphic object to which the touch input was applied has a separate freshness maintaining member, the sub-screen 600 may include information 660 related to the freshness maintaining member. For example, the information 660 related to the freshness maintaining member may include information related to an ON/OFF state, a type, a remaining power amount, and the like, of the freshness maintaining member. Referring to FIG. 6D, when the freshness maintaining member is an oxygen removing agent, the sub-screen 600 may include a check box 644 that allows a user to select to receive a notification regarding spoilage of food.

Referring to FIG. 6E, when the sensor 300 attached to food corresponding to a graphic object to which a touch input was applied is a weight sensor, the sub-screen 600 may include information related to a remaining amount of food. Also, when the sensor 300 is a weight sensor, the sub-screen 600 may include a check box 645 that allows a user to select to receive a notification regarding whether a remaining amount of corresponding food is sufficient or whether the corresponding food is required to be purchased again.

Figure 6F:
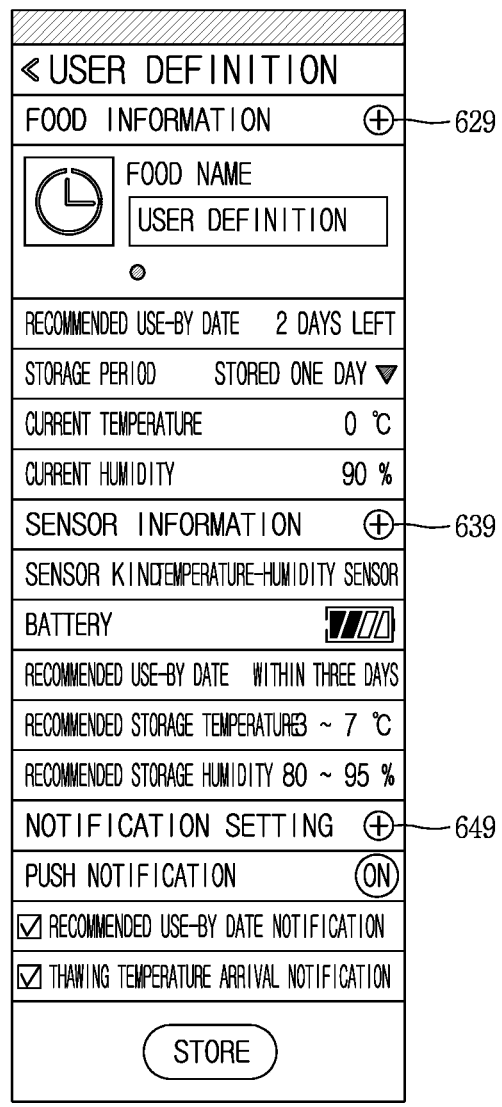

Also, referring to FIG. 6F, when a specific food group is not set in the sensor 300 attached to food corresponding to a graphic object to which a touch input is applied, the controller 180 may control the display unit 151 to output buttons 629, 639, and 649 for adding or changing an item to be displayed on the sub-screen 600.

Figure 7A:
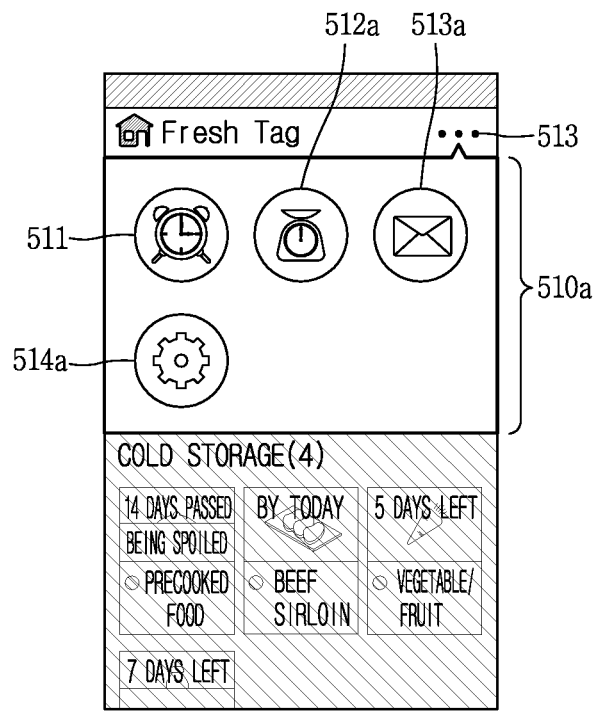

FIGS. 7A to 7G illustrate various embodiments of a setting menu related to a main screen displayed on the display unit of the mobile terminal included in the refrigerator control system according to the present disclosure. As illustrated in FIG. 7A, when a touch input is applied to a setting menu button 613 included in the main screen 500, the controller 180 may control the display unit 151 to display a setting menu on the main screen 500. The setting menu 510a may include a plurality of setting buttons 511, 512a, 51a, and 514a. For example, when a touch input is applied to the first setting button 511 of the setting menu 510a, the controller 180 may control the display unit 151 to output a setting screen 700 for setting a cooking process regarding food to be newly stored.

Figure 7B:
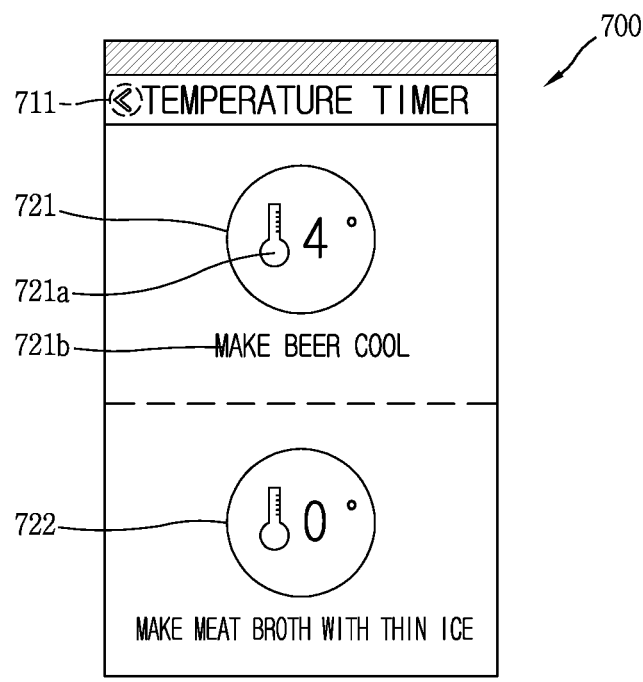

For example, referring to FIG. 7B, the setting screen 700 may include icons 721 and 722 related to a cooking process. The icon 721 may include information 721a related to a target temperature of a cooking process, and may include text information 721b related to a cooking process. Also, the setting screen 700 may include a return button 711 for receiving a user input for returning to a previous step in which the setting menu 510a was displayed.

Figure 7C:
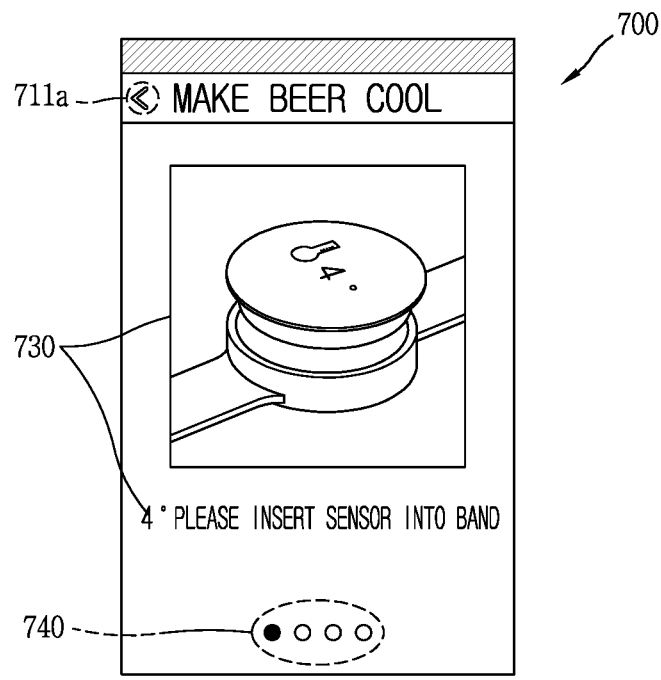

Also, referring to FIG. 7C, when a touch input is applied to any one of a plurality of icons 721 and 722 included in the setting screen 700, the controller 180 may control the display unit 151 to output an image and text information 730 for guiding a cooking process corresponding to the icon 721 or 722 to which the touch input was applied.

Figure 7D:
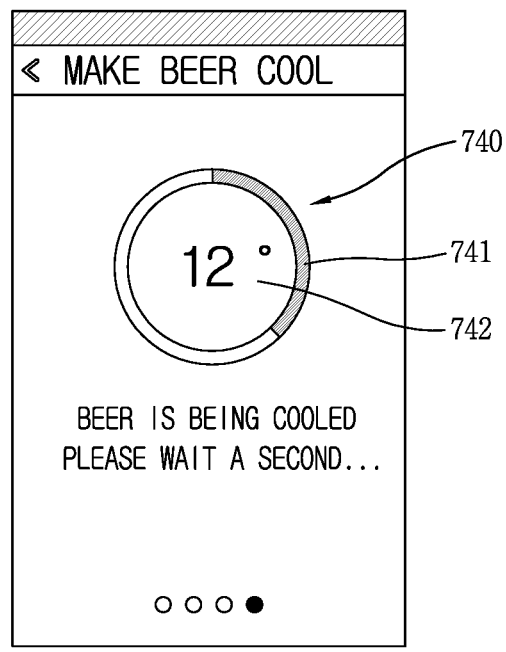

Referring to FIG. 7D, when food to which the sensor 300 is attached is stored in the refrigerator 1000 according to the output image and text information 730, the controller 180 may control the display unit 151 to output information 740 related to the progress of the set cooking process. For example, the information 740 related to the progress of the cooking process may include information 741 related to a completion rate of the cooking process and information 742 related to a temperature of food as a cooking process target.

In detail, the refrigerator control unit 1080 may output an icon 721 related to the process of cooling a beverage to a target temperature on the setting screen 700. When a user input is applied to the icon 721, the refrigerator control unit 1080 may output image information and text information 730 related to a type of a sensor for cooling the beverage to a target temperature and a type of an attachment member to be attached to the sensor. For example, the refrigerator control unit 1080 may output an image 730 related to the sensor to which a mark indicating a cooling process is displayed, and the image may include information related to a band type attachment member coupled to the sensor.

The user may select a sensor of a type corresponding to the displayed image 730 from a sensor type set, couple the selected of sensor and the band type attachment member, attach the sensor to the beverage using the band type attachment member, and store the same in the refrigerator. On the basis of information transmitted from the sensor attached to the stored beverage, the refrigerator control unit 1080 may detect a storage start time point of the beverage. Also, when the storage start time point of the beverage is detected, the refrigerator control unit 1080 may output an image 740 related to a cooling process of the beverage. The image 740 related to the cooling process of the beverage may include information 741 (e.g., progress bar) related to a progress degree to a target temperature set in the beverage and information 742 related to a current temperature of the beverage.

Figure 7E:
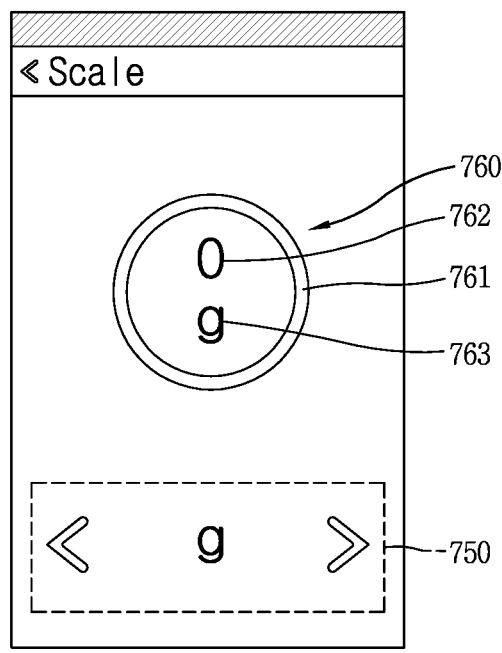

Also, referring to FIG. 7E, when a touch input is applied to a second setting button 712 of the setting menu 510a, the controller 180 may control the display unit 151 to output a setting screen 700 for setting a reference for repurchasing food to be newly stored. For example, the setting screen 700 may include an icon 760 related to a re-purchase reference. The icon 760 related to the re-purchase reference may include a number button 762 for setting a weight reference related to re-purchase, unit information 763 of the weight reference, and information 761 related to a ratio of a remaining amount to a storage start time point. Also, the setting information 700 may include a button 750 for converting unit information 763.

Figure 7F:
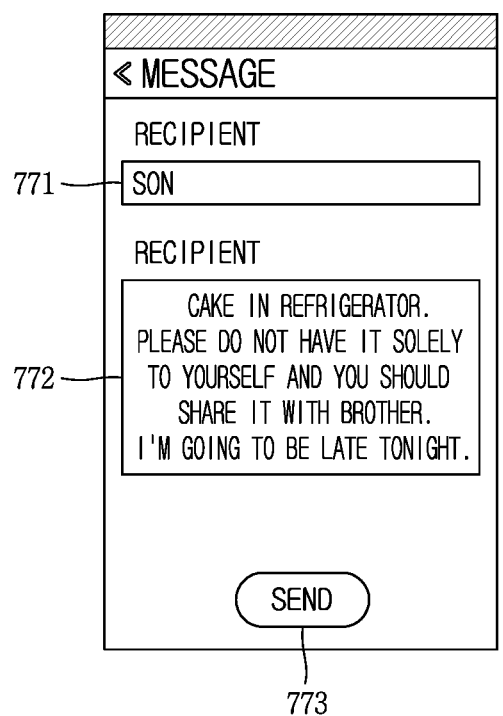

Also, referring to FIG. 7F, when a touch input is applied to a third setting button 513 of the setting menu 510a, the controller 180 may output a window for inputting a message to be displayed on an output unit 1070 or the display 1700 attached to a front surface of the refrigerator 1000. The window for inputting the message may include a box 771 for inputting a recipient of the message, a box 772 for inputting contents of the body of the message, and a button 773 for transmitting the input message.

Also, referring to FIG. 7G, when a touch input is applied to a fourth setting button 514 of the setting menu 510*a*, the controller 180 may output version information of an application, identification information of communication established with the refrigerator 1000, information related to a main title of an application, and identification information 781 of communication established between the refrigerator 1000 and the sensor 300.

Figure 8A:
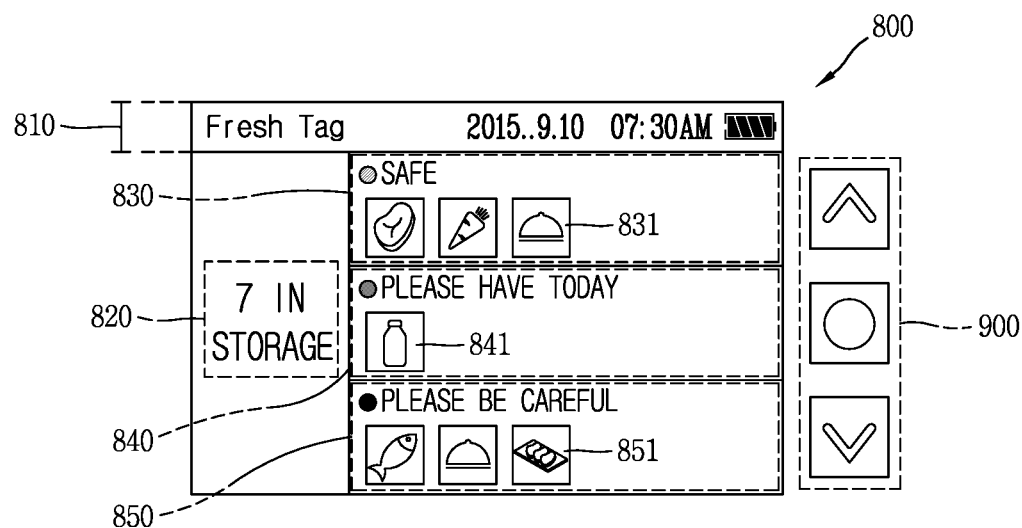
FIGS. 8A to 8J are conceptual views illustrating embodiments of information related to food, displayed on an output unit of a refrigerator according to the present disclosure.

Hereinafter, embodiments of information related to food displayed on the output unit of the refrigerator according to the present disclosure will be described with reference to FIGS. 8A to 8J. As illustrated in FIG. 8A, the output unit 1070 or the display 1700 of the refrigerator 1000 may output a graphic object related to at least one of state information of food sensed by the sensor 300 or food information of food stored in the memory unit 1060. When a predetermined application for checking food stored in the refrigerator 1000 is executed in the refrigerator 1000, the refrigerator control unit 1080 may control the output unit 1070 to output a main screen 800 of the application.

In detail, the main screen 800 may include at least one of a first part 810, a second part 820, a third part 830, a fourth part 840, and a fifth part 850. Information related to a main title of the application may be displayed in the first part 810. Also, information related to a current time may be output in the first part 810.

Information related to a number of sensors 300 disposed within the refrigerator 1000 may be displayed in the second part 820. The information related to the number of the sensors 300 may correspond to the number of foods stored in the refrigerator 1000.

A graphic object 831 corresponding to food that is safe, e.g., whose time interval from a current time point to a time point at which the food is predicted to spoil is a reference time interval or greater, may be displayed in the third part 830. The graphic object 831 may correspond to food whose recommended use period or expiration date set therein is determined not to have arrived yet, and may be displayed in the third part 830. A graphic object 841 for food that has reached expiration may be displayed in the fourth part 840. A graphic object 851 corresponding to articles determined to have spoiled may be displayed in the fifth part 850.

Compared with FIG. 5A, the output unit 1070 of the refrigerator 1000 may divide the main screen 800 according to whether a spoilage time point of food has not arrived, whether the spoilage time point of food has arrived, or whether the spoilage time point of food has elapsed. On the other hand, the main screen 800 output on the output unit 1070 may be divided according to a food storage position or cooking process according to the same purpose as that of the main screen 500. Moreover, a button 900 for receiving a user input for changing information to be displayed on the output unit 1070 may be output in a portion of the output unit 1070.

Figure 8B:
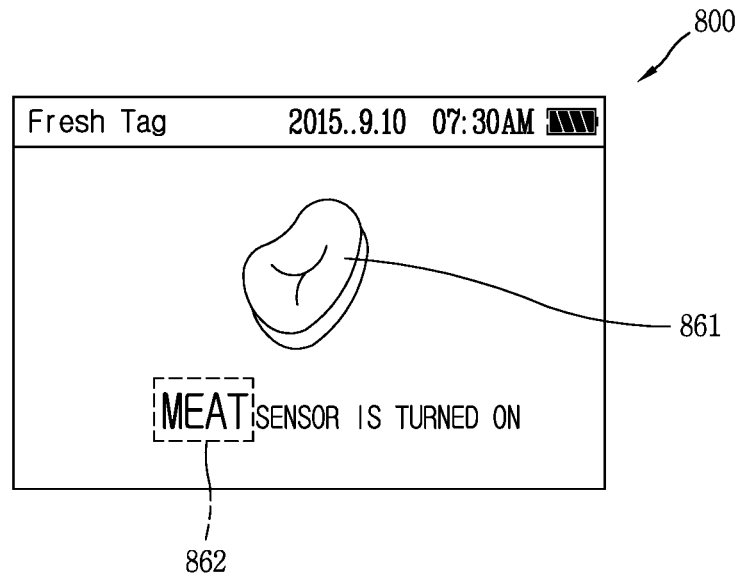
Figure 8C:
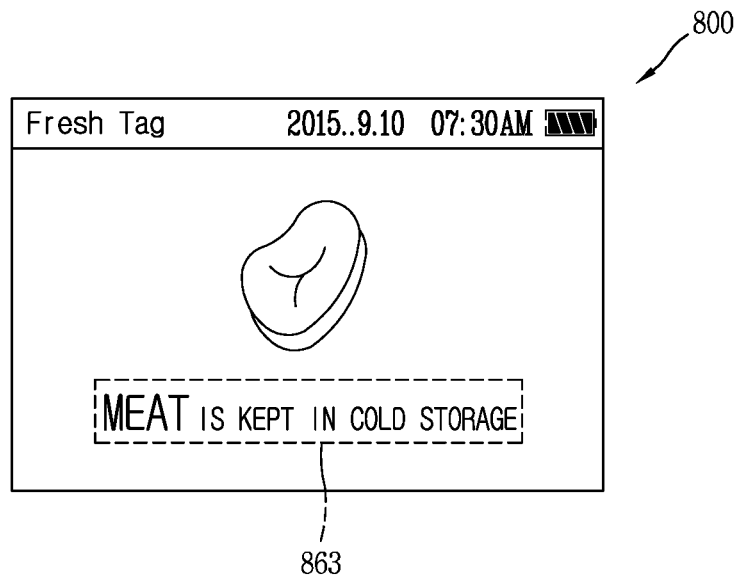

Referring to FIG. 8B, when a new food is first stored in the refrigerator 1000, the refrigerator control unit 1080 may control the output unit 1070 to output an image 861 related to a type of food to which the sensor 300 is attached and text information 862 related to the type of the food. For example, when new food is first added to the refrigerator 1000, the sensor 300 may detect a storage start time point at which the food is first stored in the refrigerator 1000, and the refrigerator control unit 1080 may control the output unit 1070 to output the graphic objects 861 and 862 including notification information related to the food which is added at the storage start time point. Also, referring to FIG. 8C, the notification information related to food may include information 863 related to a food group of the food and a storage position of the food.

Figure 8D:
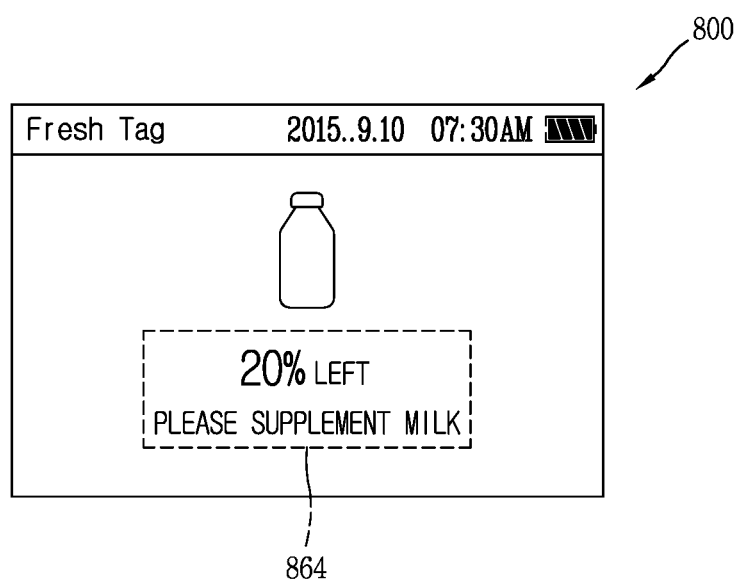

Referring to FIG. 8D, when a food which is determined to be required to be purchased again is identified among foods stored in the refrigerator 1000, the refrigerator control unit 1080 may control the output unit 1070 to output a graphic object 864 including notification information related to re-purchase of the corresponding food.

Figure 8E:
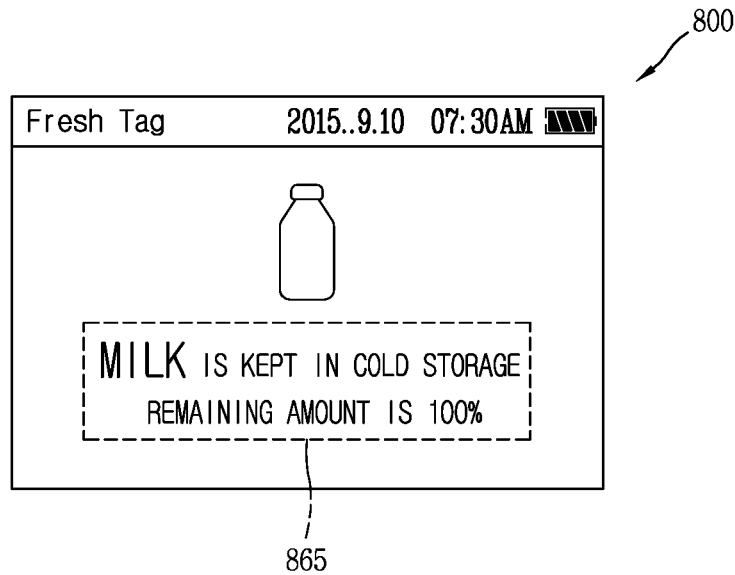

Referring to FIG. 8E, the refrigerator control unit 1080 may determine whether some of the entire food groups are required to be purchased again. When food corresponding to a food group whose re-purchase is required to be determined is newly added to the refrigerator, the refrigerator control unit 1080 may control the output unit 1070 such that information related to a remaining amount of food is included in the graphic object 865 related to the food.

Figure 8F:
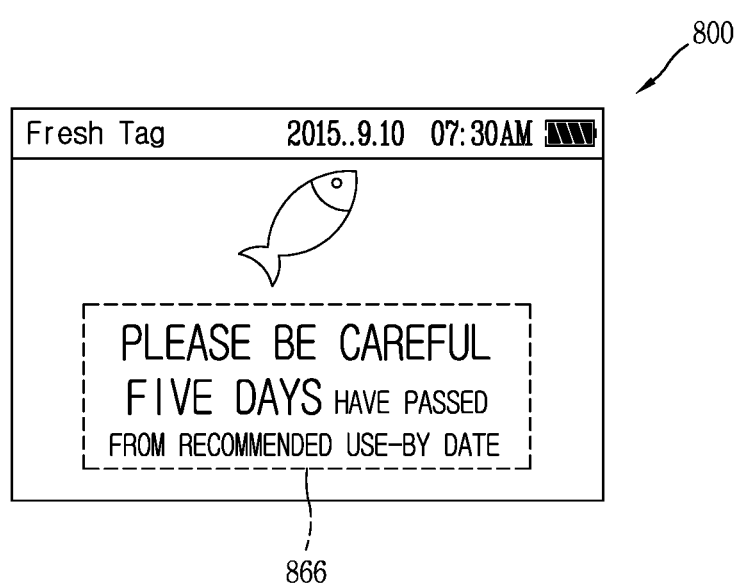

As illustrated in FIG. 8F, when a storage period of food has elapsed a preset recommended use-by date of corresponding food, the refrigerator control unit 1080 may control the output unit 1070 such that notification information 866 for indicating whether the corresponding food has elapsed is included in the graphic object.

Figure 8G:
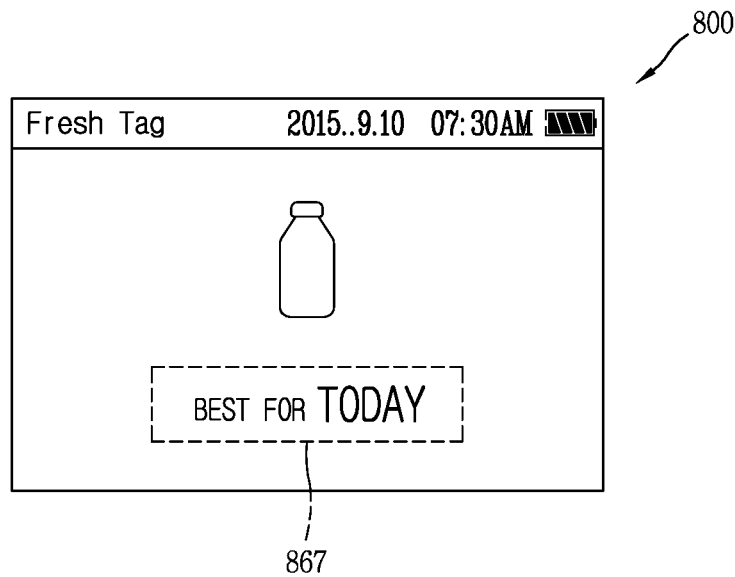

Referring to FIG. 8G, when a storage period of food corresponds to a recommended use-by date previously set in a corresponding food, the refrigerator control unit 1080 may control the output unit 1070 to include notification information 867 for indicating a corresponding recommended use-by date of the corresponding food in the graphic object. Here, the refrigerator control unit 1080 may control the output unit 1070 to include notification information 867 for indicating whether the recommended use-by date has arrived in the graphic object. Also, the refrigerator control unit 1080 may control the output unit 1070 to include notification information 867 in the graphic object for indicating whether a time point at which food is predicted to spoil has arrived.

Figure 8H:
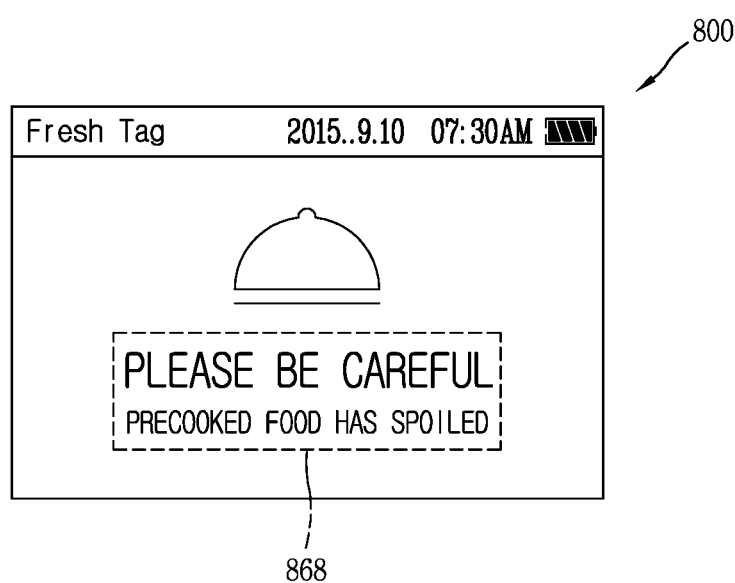
Figure 8I:
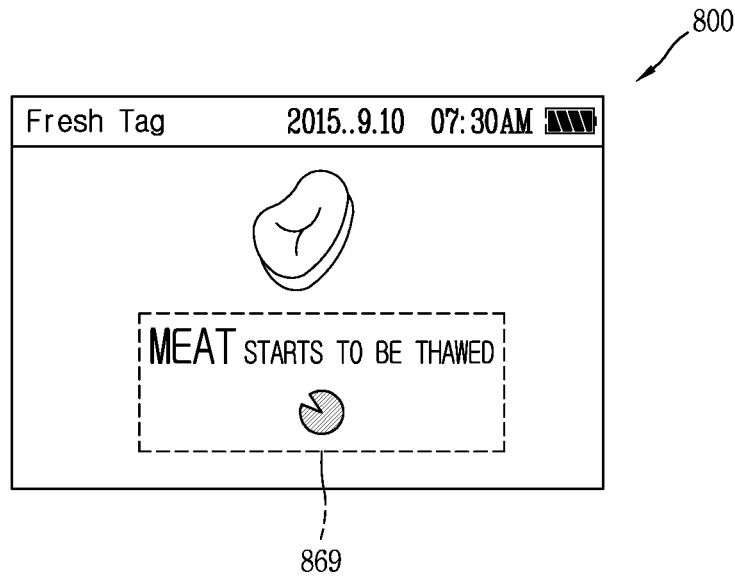
Figure 8J:
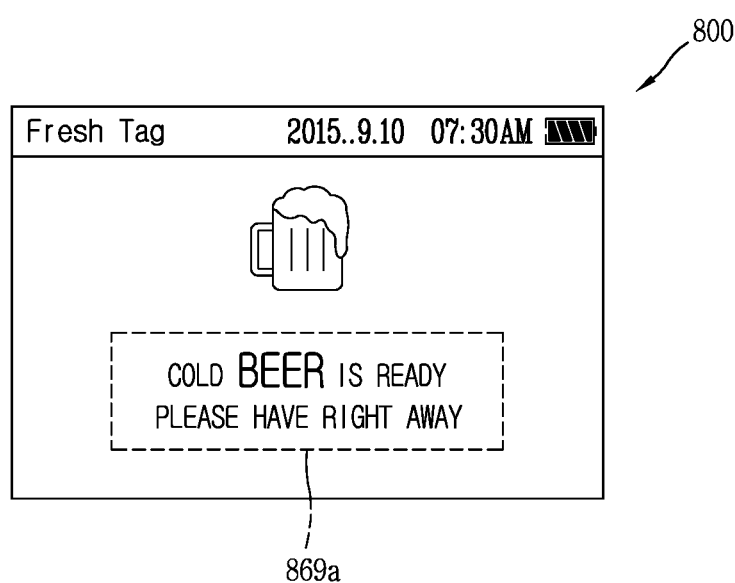

Referring to FIG. 8H, the refrigerator control unit 1080 may determine whether food has spoiled, and control the output unit 1070 to include notification information 868 for indicating whether food has spoiled in the graphic object. Referring to FIG. 8I, when a predetermined cooking process is performed on stored food, the refrigerator control unit 1080 may control the output unit 1070 to include information 869 related to the progress of the cooking process in the graphic object. Referring to FIG. 8J, when the predetermined cooking process performed on the stored food is completed, the refrigerator control unit 1080 may control the output unit 1070 to include information 869*a* related to completion of the cooking process in the graphic object.

Figure 9A:
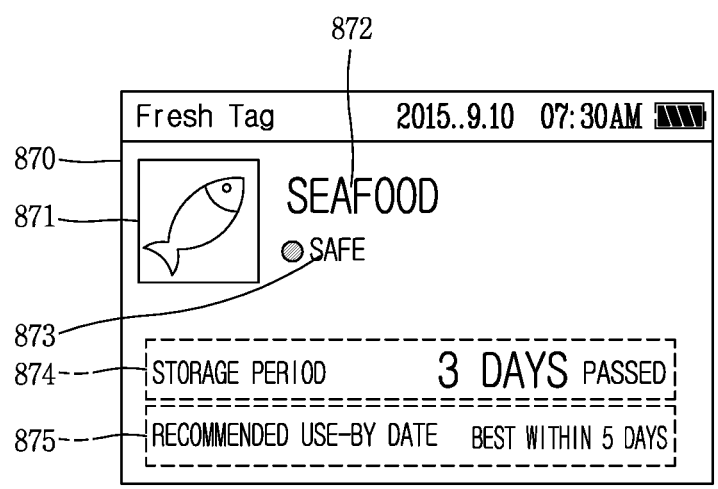
FIGS. 9A to 9C are conceptual views illustrating embodiments of information related to food, displayed on an output unit of a refrigerator according to the present disclosure.
Figure 9A:
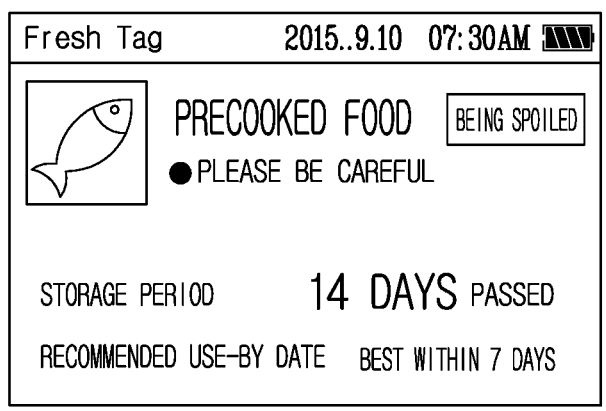

Hereinafter, embodiments of information related to food displayed on the output unit of the refrigerator according to the present disclosure will be described with reference to FIGS. 9A to 9C. As illustrated in FIG. 9A, when a touch input is applied to at least one graphic object included in a main screen 800 illustrated in FIG. 8A, the refrigerator control unit 1080 may switch the output main screen 800 to a sub-screen 870. The sub-screen 870 may include at least one of an image 871 of food, text information 872 related to a food group, information 873 related a condition of the food, information 874 related to a storage period, and information 875 related to a recommended use-by date.

Figure 9B:
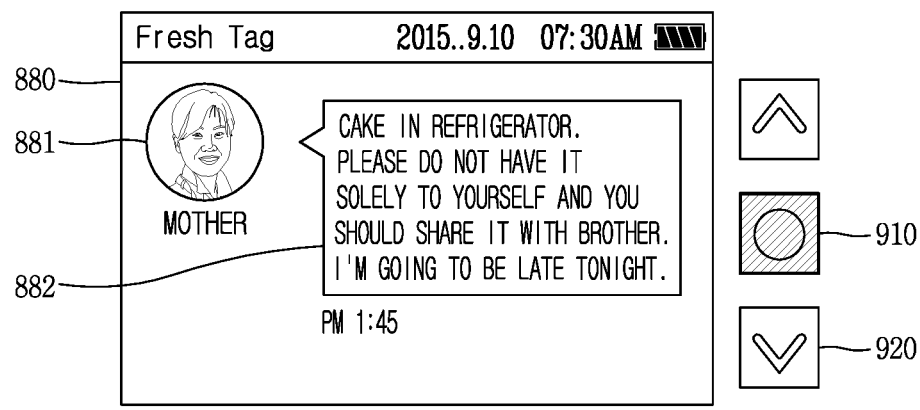
Figure 9C:
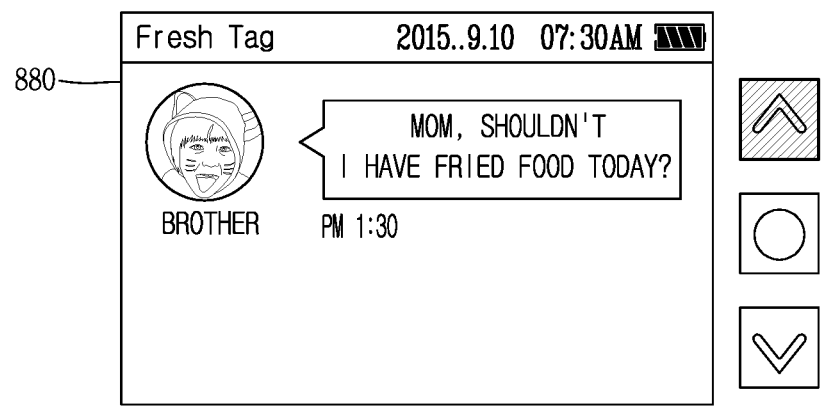

FIGS. 9B and 9C illustrate the output unit outputting a message screen 880 received from each of a plurality of mobile terminals included in the refrigerator control system. The message screen 880 may include an image 881 related to a message sender and text information 882 related to contents of the body of the message.

According to the present disclosure, since the user receives information related to an expiration date of food from the sensor attached to each food stored in the refrigerator, an effect of easily maintaining freshness of food is obtained.

Also, according to the present disclosure, since information related to an expiration date of food is provided to the user, spoilage of food stored in the refrigerator may be prevented, and thus, an effect of enhancing health of the user of the refrigerator may be obtained.

Also, according to the present disclosure, since information related to an expiration date of food is provided to the user, the user may easily establish a use plan regarding food stored in the refrigerator.

Also, according to the present disclosure, since information related to a remaining amount of food is provided to the user, the user may purchase corresponding food before the food stored in the refrigerator is consumed, thereby preventing periods in which desired or required food is not available.

Also, according to the present disclosure, since a time point at which each food starts to be stored is individually detected without requiring user manipulation or user input, an effect of enhancing user convenience is obtained.

Also, according to the present disclosure, since a sensor having various types of attachment members is provided, information related to various metrics such as a temperature of food, humidity within a container accommodating food, and a gas generated in food may be easily detected.

Therefore, an aspect of the detailed description is to provide a sensor capable of detecting information related to an appropriate storage period of each food stored in a refrigerator, and calculating an expiration date on the basis of a detected storage period of each food, and a refrigerator including the sensor.

Another aspect of the detailed description is to provide a sensor capable of preventing smells of various food groups stored in a refrigerator from being mixed and contaminating foods, while sensing information of each food, thus improving food hygiene and user convenience, and a refrigerator including the sensor.

Another aspect of the detailed description is to provide a sensor capable of sensing whether food stored in a refrigerator has spoiled, and providing a sensing result to a user, and a refrigerator including the sensor.

Another aspect of the detailed description is to provide a sensor capable of transferring re-purchase notification information to a user in order to allow the user to recognize whether corresponding food stored in a refrigerator is required to be re-purchased before being wholly consumed, and a refrigerator including the sensor.

Another aspect of the detailed description is to provide a sensor capable of detecting a temperature of food stored in a refrigerator in real time and providing information related to an appropriate cooking method regarding the corresponding food, and a refrigerator including the sensor.

Another aspect of the detailed description is to provide a sensor capable of remotely providing state information of food stored in a refrigerator to a user who is away from the refrigerator at a predetermined distance or longer, and a refrigerator including the sensor.

Another aspect of the detailed description is to provide a sensor which is directly attached to food or attached to a container accommodating food in order to sense state information related to a state of each food stored in a refrigerator, and a refrigerator including the sensor.

To achieve these and other advantages and in accordance with the purpose of this specification, as embodied and broadly described herein, a sensor package may have installed thereon food information related to refrigerated (cold storage-related) food by kinds of food, wherein, on an appearance of the sensor package, a mark classified by kinds of food and indicating a kind of food allocated to the sensor package to allow a user to recognize a kind of food is disposed, and wherein, on the inside of the sensor package, a battery providing electric power to the sensor package and an operation switch cutting off or permitting power supply to the battery, a memory configured to store food information corresponding to a kind of the indicated food, a sensor communication module configured to perform communication with a display disposed in a refrigerator, a sensing module configured to sense state information corresponding to the sensor package, and a sensor control module controlling the sensor communication module to initiate communication between the sensor package and the display of the refrigerator on the basis of state information sensed by the sensing module, may be disposed.

The sensing module may detect information related to a temperature of one point of the sensor package, and the sensor control module may detect a storage start time point on the basis of information related to the detected temperature. The sensor control module may detect a time point at which the sensed temperature is reduced to below a reference temperature value, as a storage start time point of food.

When a change in temperature equal to higher than a preset temperature value is sensed, the sensor control module may detect a time point at which the change in temperature is sensed, as a storage start time point of food.

The sensing module may detect information related to an amount of light irradiated to one point of the sensor package, and the sensor control module may detect the storage start time point on the basis of the detected amount of light.

When an amount of light irradiated to one point of the sensor package is reduced to below a reference light amount value, the sensor control module may detect a time point at which the irradiated amount of light is reduced to below a reference light amount value, as the storage start time point.

The sensing module may detect information related to a weight of an object placed at one point of the sensor package, and the sensor control module may detect the storage start time point on the basis of information related to the detected weight. The sensor control module may detect a time point at which the detected weight is changed by more than a preset weight value, as a storage start time point of food.

The display of the refrigerator may further include a communication unit configured to perform wireless communication with the sensor package, and the sensor control module may detect a time point at which communication is established between the sensor communication module and the communication unit, as a storage start time point of food. Moreover, the food information may include information related to at least one of a cooking process, a recommended use-by date, a recommended storage temperature, and a recommended storage humidity set for the food.

To achieve these and other advantages and in accordance with the purpose of this specification, as embodied and broadly described herein, a refrigerator may include: a sensor configured to sense state information related to a state of food present within a refrigerator; a memory unit configured to store food information related to the food; an output unit configured to output a graphic object related to at least one of state information sensed by the sensor and food information stored in the memory unit; and a refrigerator control unit configured to set information related to the graphic object by comparing the information sensed by the sensor and setting information stored in the memory unit, wherein a mark classified by kinds of food and indicating a kind of food allocated to the sensor package to allow a user to recognize a kind of food is disposed, and the sensor detects a storage start time point at which the food starts to be stored in the refrigerator and senses the state information from the detected storage start time point.

The refrigerator may control the output unit to output notification information related to the food which starts to be stored at the storage start time point. The refrigerator control unit may control the output unit to output at least one graphic object corresponding to each of at least one food present within the refrigerator.

The refrigerator control unit may control the output unit to change an output graphic among at least one graphic object, on the basis of a user input applied to the output unit. When a user input is applied to the output graphic object, the refrigerator control unit may control the output unit to display information related to food corresponding to the graphic object to which the user input is applied.

The information related food may include at least one of the state information sensed at a storage start time point of the food, state information of the food sensed at a current time point, and food information related to the food. The state information may include information related to a weight of the food, and the controller may control the output unit to output information related to a remaining amount of the food on the basis of information related to a weight of the food.

The controller may compare a weight of the food at the storage start time point, a weight of the food at a current time point, determine whether the food is insufficient on the basis of the comparison result, and control the output unit to output information related to the determination result.

The sensor may detect information related to an amount of light irradiated to one point of the sensor, and the refrigerator control unit may detect the storage start time point on the basis of the detected amount of light. When an amount of light irradiated to one point is reduced by within a preset time interval from above a first light amount reference value to below a second light amount reference value, the refrigerator control unit may detect a time point at which the irradiated amount of light is dropped to below the second light amount reference value, as the storage start time point.

The sensor may detect information related to a weight of an object placed at one point of the sensor, and the refrigerator control unit may detect the storage start time point on the basis of information related to the detected weight. The refrigerator control unit may detect a time point at which the detected weight is changed by more than a preset weight value, as a storage start time point of food.

The sensor may detect information related to a temperature of one point of the sensor, and the refrigerator control unit may detect the storage start time point on the basis of the detected information related to the temperature. The refrigerator control unit may detect a time point at which the sensed temperature is reduced to below a reference temperature value, as a storage start time point of food. Moreover, when a change in temperature equal to or greater than a preset temperature value is sensed, the refrigerator control unit may detect a time point at which the change in temperature is sensed, as a storage start time point of food.

The refrigerator may further include: a communication unit configured to perform wireless communication, wherein the refrigerator control unit may detect a time point at which communication is established between the sensor and the communication unit, as a storage start time point.

The sensor may detect information related to a kind and a generation amount of a gas generated from food, and the refrigerator control unit may detect information related to a food group of food to which the sensor is attached, and determine whether the food has spoiled on the basis of information related to the sensed kind and generation amount of the gas.

When it is determined that the food has spoiled, the refrigerator control unit may control the output unit such that a graphic object corresponding to the food includes notification information related to whether the food has spoiled. Moreover, the food information may include information related to at least one of a cooking process, a recommended use-by date, a recommended storage temperature, and a recommended storage humidity set for the food.

To achieve these and other advantages and in accordance with the purpose of this specification, as embodied and broadly described herein, a refrigerator control system may include a sensor, a refrigerator, and a terminal. The sensor may be attached to food present within the refrigerator to detect a storage start time point at which the food starts to be stored in the refrigerator and sense the state information from the detected storage start time point. The refrigerator may include: a communication unit configured to receive state information sensed by the sensor and perform communication with the terminal; a memory unit configured to store at least one of the received state information and food information related to the food; an output unit configured to output a graphic object related to at least one of the state information sensed by the sensor and food information stored in the memory; and a refrigerator control unit configured to set information related to the graphic object by comparing the information sensed by the sensor and food information stored in the memory, and the terminal includes: a communication unit configured to perform communication with the communication unit; an input unit configured to receive a user input related to the food information; and a display unit configured to output information at least one of state information related to the food and food information; and a controller configured to control the display unit on the basis of the user input.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A sensor package configured to perform communication with a refrigerator, in a sensor package storing food information related to storage in a fresh state of a specific type of food,
   characterized in that the sensor package is detachably provided for each kind of food within the refrigerator,
   the sensor package is provided with a mark on an outside thereof, the mark classified by a kind of food to indicate the kind of food allocated to the sensor package so that a user recognizes the kind of food,
   the sensor package comprises;
   a battery configured to provide electric power to the sensor package and an operation switch configured to cut off or permit power supply to the battery,
   a memory configured to store food information corresponding to the indicated kind of food,
   a sensor transmitter/receiver configured to perform communication with a display disposed on an outside of the refrigerator,
   a temperature sensor configured to sense temperature information related to the food corresponding to the sensor package, and
   a sensor controller configured to start an operation based on the temperature information sensed by the temperature sensor, and
   the sensor controller controls the sensor transmitter/receiver to initiate communication between the sensor package and the display of the refrigerator based on the temperature information,
   wherein the sensor controller detects a time point at which a detected temperature is reduced to below a reference temperature value, as a food storage start time point.

2. The sensor package of claim 1, wherein the food information includes information related to at least one of a cooking process, a recommended use-by date, a recommended storage temperature, and a recommended storage humidity set for the food.

3. The sensor package of claim 1,
   wherein the sensor package further comprises:
   an illumination sensor configured to detect information related to an amount of light irradiated to one point of the sensor package; and
   a weight sensor configured to detect information related to a weight of an object provided on one point of the sensor package, and
   wherein the sensor controller determines the food storage start time point based on any one of the detection results of the temperature sensor, the illumination sensor, and the weight sensor, when the detected temperature is reduced to below the reference temperature value.

4. The sensor package of claim 3, wherein the sensor controller determines the food storage start time point according to any one of a first time point at which the sensed temperature is reduced to below the reference temperature value, a second time point at which the sensed amount of light is reduced to below a reference light amount value, and a third time point at which the sensed weight has changed by more than a preset weight value,
   wherein the determined food storage start time point is a first sensed time point or a last sensed time point among the first to third time points.

* * * * *